(12) United States Patent
Boissiere et al.

(10) Patent No.: US 12,688,664 B2
(45) Date of Patent: *Jul. 21, 2026

(54) VIRTUAL PAPER

(71) Applicant: Apple Inc., Cupertino, CA (US)

(72) Inventors: Clement P. Boissiere, San Francisco, CA (US); Samuel L. Iglesias, Palo Alto, CA (US); Timothy Robert Oriol, San Jose, CA (US); Adam Michael O'Hern, Campbell, CA (US)

(73) Assignee: Apple Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/913,874

(22) Filed: Oct. 11, 2024

(65) Prior Publication Data

US 2025/0037404 A1 Jan. 30, 2025

Related U.S. Application Data

(63) Continuation of application No. 18/220,684, filed on Jul. 11, 2023, now Pat. No. 12,148,116, which is a
(Continued)

(51) Int. Cl.
*G06T 19/20* (2011.01)
*G06T 19/00* (2011.01)
(Continued)

(52) U.S. Cl.
CPC ............ *G06T 19/20* (2013.01); *G06T 19/006* (2013.01); *H04N 13/122* (2018.05); *H04N 13/156* (2018.05); *G06T 2219/2016* (2013.01)

(58) Field of Classification Search
CPC ................... G06T 19/20; G06T 19/006; G06T 2219/2016; G06T 2219/2004;
(Continued)

(56) References Cited

U.S. PATENT DOCUMENTS 11,328,497 B2 5/2022 Boissiere et al.
11,748,966 B2 9/2023 Boissiere et al.
(Continued)

FOREIGN PATENT DOCUMENTS

CN 106133796 A 11/2016
CN 107004303 A 8/2017
(Continued)

OTHER PUBLICATIONS

Extended European Search Report dated Jul. 31, 2020, European Application No. 20162677.7, pp. 1-9.
(Continued)

*Primary Examiner* — Chong Wu
(74) *Attorney, Agent, or Firm* — Fernando & Partners, LLP

(57) ABSTRACT

In one embodiment, a method of intermingling stereoscopic and conforming virtual content to a bounded surface is performed at a device that includes one or more processors, non-transitory memory, and one or more displays. The method includes displaying a bounded surface within a native user computer-generated reality (CGR) environment, wherein the bounded surface is displayed based on a first set of world coordinates characterizing the native user CGR environment. The method further includes displaying a first stereoscopic virtual object within a perimeter of a first side of the bounded surface, wherein the first stereoscopic virtual object is displayed in accordance with a second set of world coordinates that is different from the first set of world coordinates characterizing the native user CGR environment.

20 Claims, 26 Drawing Sheets

Related U.S. Application Data continuation of application No. 17/707,025, filed on Mar. 29, 2022, now Pat. No. 11,748,966, which is a continuation of application No. 16/821,102, filed on Mar. 17, 2020, now Pat. No. 11,328,497.

(60) Provisional application No. 62/820,137, filed on Mar. 18, 2019.

(51) Int. Cl.
H04N 13/122 (2018.01)
H04N 13/156 (2018.01)

(58) Field of Classification Search
CPC ............ G06T 2219/2024; G06T 13/20; H04N 13/122; H04N 13/156; H04N 19/395; H04N 13/366; G06F 3/011; G06F 3/04815; G06F 3/0485; G06F 3/012; G06F 3/013
See application file for complete search history.

(56) References Cited

U.S. PATENT DOCUMENTS

| | | | | |
|---|---|---|---|---|
| 12,148,116 | B2 * | 11/2024 | Boissiere | G06F 3/011 |
| 2002/0180808 | A1 | 12/2002 | Fujita et al. | |
| 2010/0079371 | A1 | 4/2010 | Kawakami et al. | |
| 2012/0162210 | A1 | 6/2012 | Cabrita | |
| 2014/0132629 | A1 | 5/2014 | Pandey et al. | |
| 2014/0375679 | A1 | 12/2014 | Margolis et al. | |
| 2015/0312561 | A1 | 10/2015 | Hoof et al. | |
| 2016/0077344 | A1 | 3/2016 | Burns | |
| 2016/0180590 | A1 | 6/2016 | Kamhi et al. | |
| 2016/0189426 | A1 | 6/2016 | Thomas et al. | |
| 2017/0329416 | A1 | 11/2017 | West et al. | |
| 2018/0143757 | A1 | 5/2018 | Champion et al. | |
| 2018/0164589 | A1 | 6/2018 | Watanabe et al. | |
| 2020/0066047 | A1 | 2/2020 | Karalis et al. | |

FOREIGN PATENT DOCUMENTS

| | | | |
|---|---|---|---|
| CN | 107111370 | A | 8/2017 |
| CN | 108604121 | A | 9/2018 |
| CN | 109477966 | A | 3/2019 |
| CN | 109478095 | A | 3/2019 |
| CN | 109478343 | A | 3/2019 |
| EP | 2348383 | A1 | 7/2011 |
| EP | 3026529 | A1 | 6/2016 |
| JP | 2002352219 | A | 12/2002 |
| JP | 2012138087 | A | 7/2012 |
| KR | 20140100547 | A | 8/2014 |

OTHER PUBLICATIONS

Notification of Reasons for Refusal dated Apr. 8, 2021, Japanese Application No. 2020-047380, pp. 1-7 (Including English Translation).

Naver Blog Entry posted Jul. 20, 2017, Retrieved from the Internet: https://blog.naver.com/xjeunna/221055763728, pp. 1-47 (Including Machine Generated English Translation).

Naver Blog Entry posted Oct. 29, 2016, Retrieved from the Internet: https://blog.naver.com/adlibqueen/220848142023, pp. 1-13 (Including Machine Generated English Translation).

Notice of Preliminary Rejection dated Jan. 26, 2021, Korean Application No. 10-2020-0033220, pp. 1-12 (Including English Translation).

Communication Pursuant to Article 94(3) EPC dated Sep. 20, 2021, European Application No. 20162677.7, pp. 1-9.

Jeff Weeks, "Real-Time Rendering in Curved Spaces," IEEE Computer Graphics and Applications 22.6 (2002): 90-99.

Summons to Attend Oral Proceedings Pursuant to Rule 115(1) EPC issued Jul. 12, 2022, European Application No. 20162677.7, pp. 1-8.

Li, "Study of Optimization in Modeling Based on VR", Liaoning Technology University, Fuxin 123000, 2 pages, 1994-2023 China Academic Journal Electronic Publishing House. English abstract only.

Notice to Grant for corresponding Chinese Application No. 202010191667.X dated Jul. 16, 2023 (English translation of references).

Extended European Search Report for corresponding European Application No. 23178349.9 dated Sep. 28, 2023.

Zhang, "Research on double hands interaction technology in virtual assembly simulation", Computer Application Technology School of Information Engineering, May 2012, 63 pages (No. translation).

* cited by examiner

100B

Real-World Scene 40

10

Network 20

Computing Device 30

Data for Scene 106 -> Body pose Info 108

Camera 104a

Controller 102

Device 104b

Controller 102

Memory 220

Operating System 230

CGR Experience Module 240

Data Obtaining Unit 242

Tracking Unit 244

Coordination Unit 246

Data Transmitting Unit 248

CPU(s) 202

Comm. Interface(s) 208

204

I/O Devices 206

Programming Interface(s) 210

Device 104

400

405

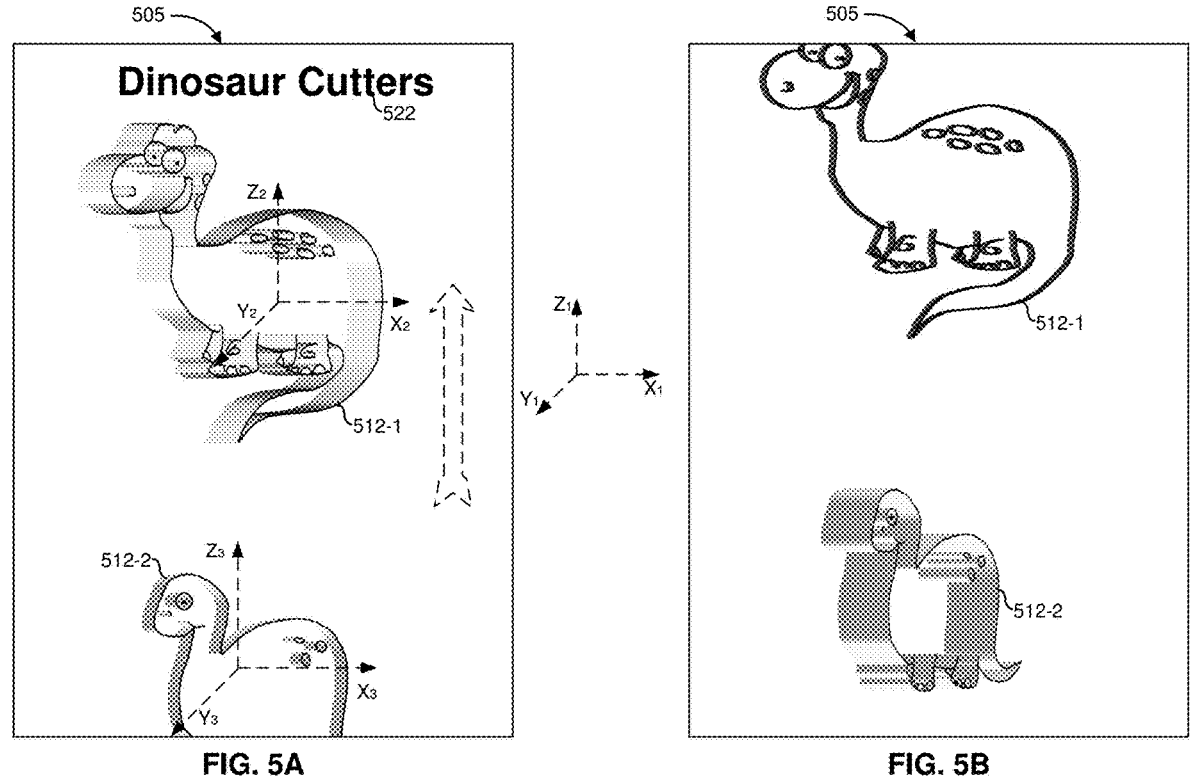
FIG. 5A                      FIG. 5B

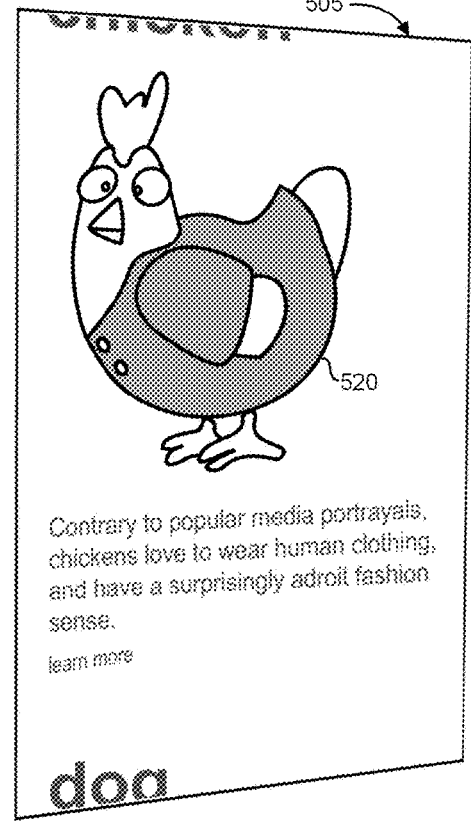
FIG. 5E
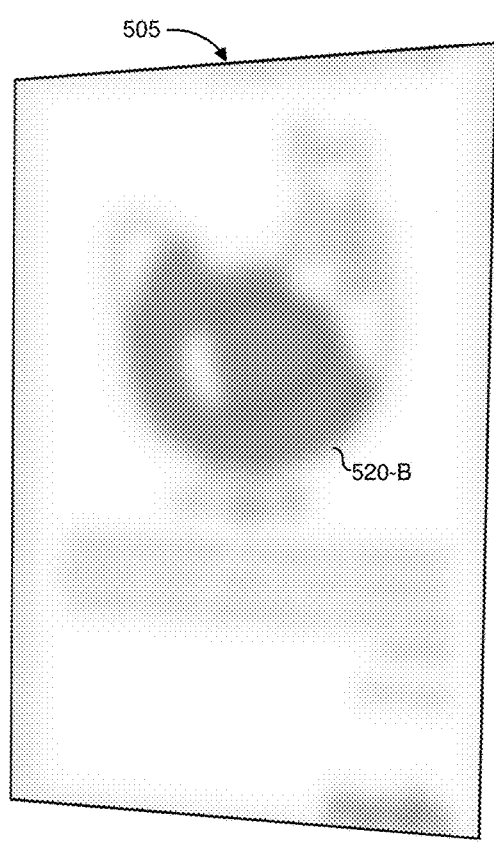
FIG. 5F

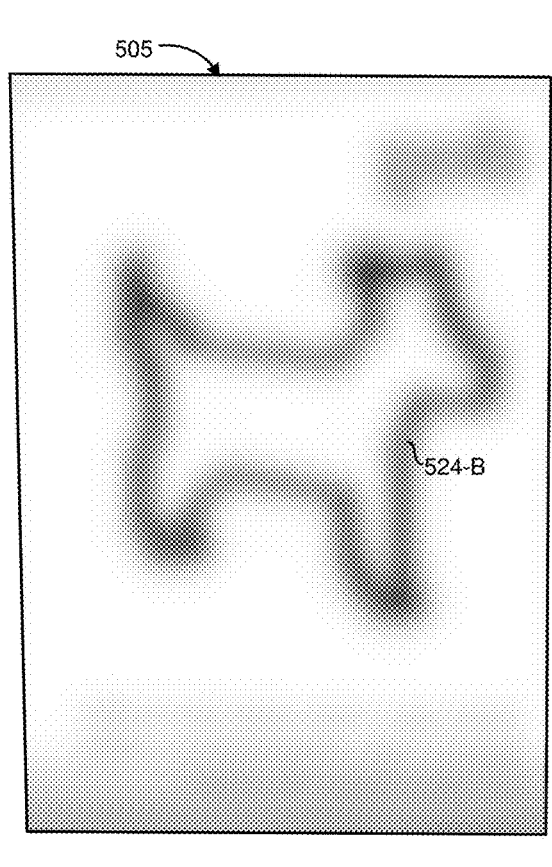
FIG. 5G
FIG. 5H

600

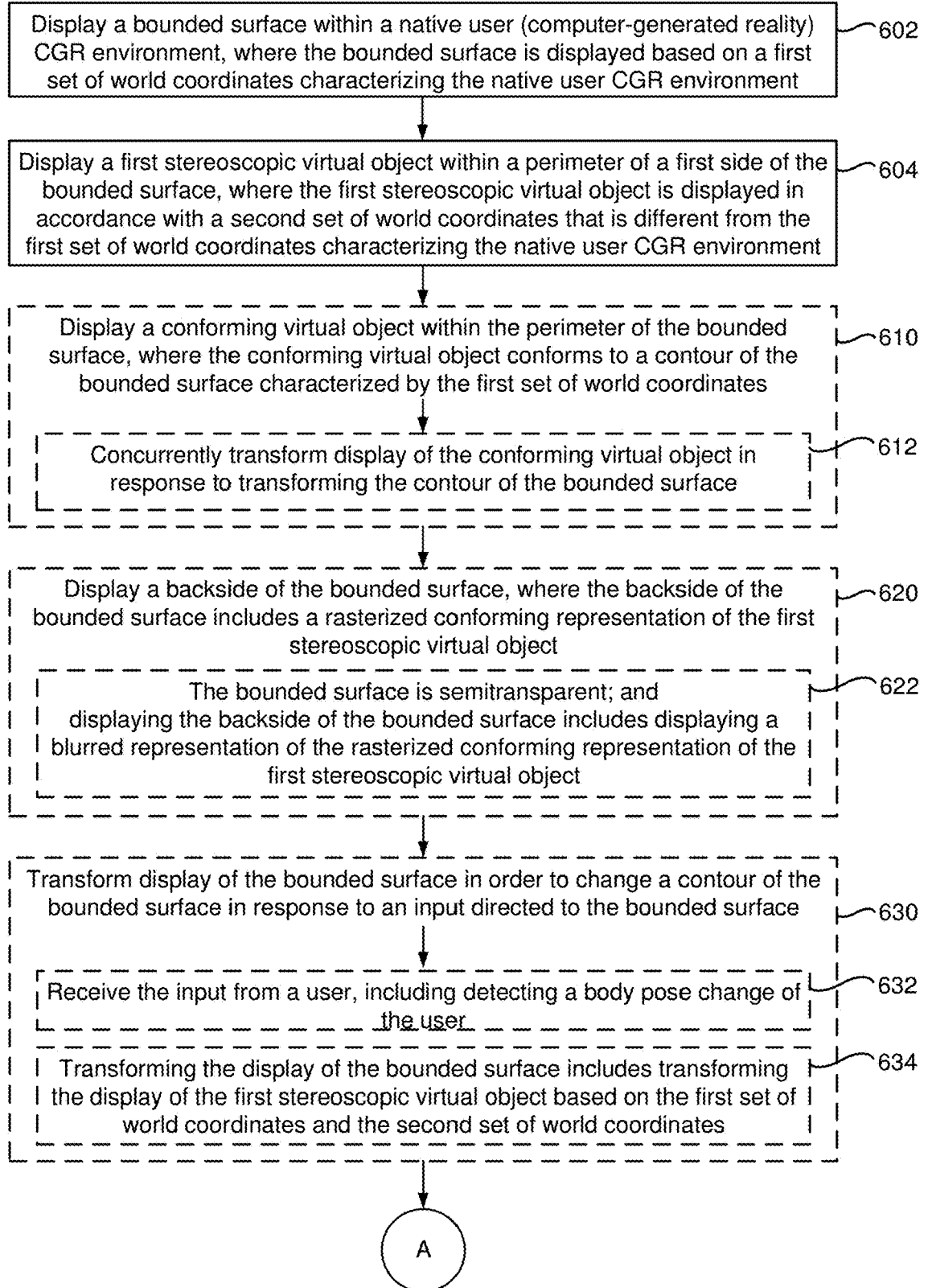

Display a bounded surface within a native user (computer-generated reality) CGR environment, where the bounded surface is displayed based on a first set of world coordinates characterizing the native user CGR environment ⌐602

Display a first stereoscopic virtual object within a perimeter of a first side of the bounded surface, where the first stereoscopic virtual object is displayed in accordance with a second set of world coordinates that is different from the first set of world coordinates characterizing the native user CGR environment ⌐604

Display a conforming virtual object within the perimeter of the bounded surface, where the conforming virtual object conforms to a contour of the bounded surface characterized by the first set of world coordinates ⌐610

Concurrently transform display of the conforming virtual object in response to transforming the contour of the bounded surface ⌐612

Display a backside of the bounded surface, where the backside of the bounded surface includes a rasterized conforming representation of the first stereoscopic virtual object ⌐620

The bounded surface is semitransparent; and displaying the backside of the bounded surface includes displaying a blurred representation of the rasterized conforming representation of the first stereoscopic virtual object ⌐622

Transform display of the bounded surface in order to change a contour of the bounded surface in response to an input directed to the bounded surface ⌐630

Receive the input from a user, including detecting a body pose change of the user ⌐632

Transforming the display of the bounded surface includes transforming the display of the first stereoscopic virtual object based on the first set of world coordinates and the second set of world coordinates ⌐634

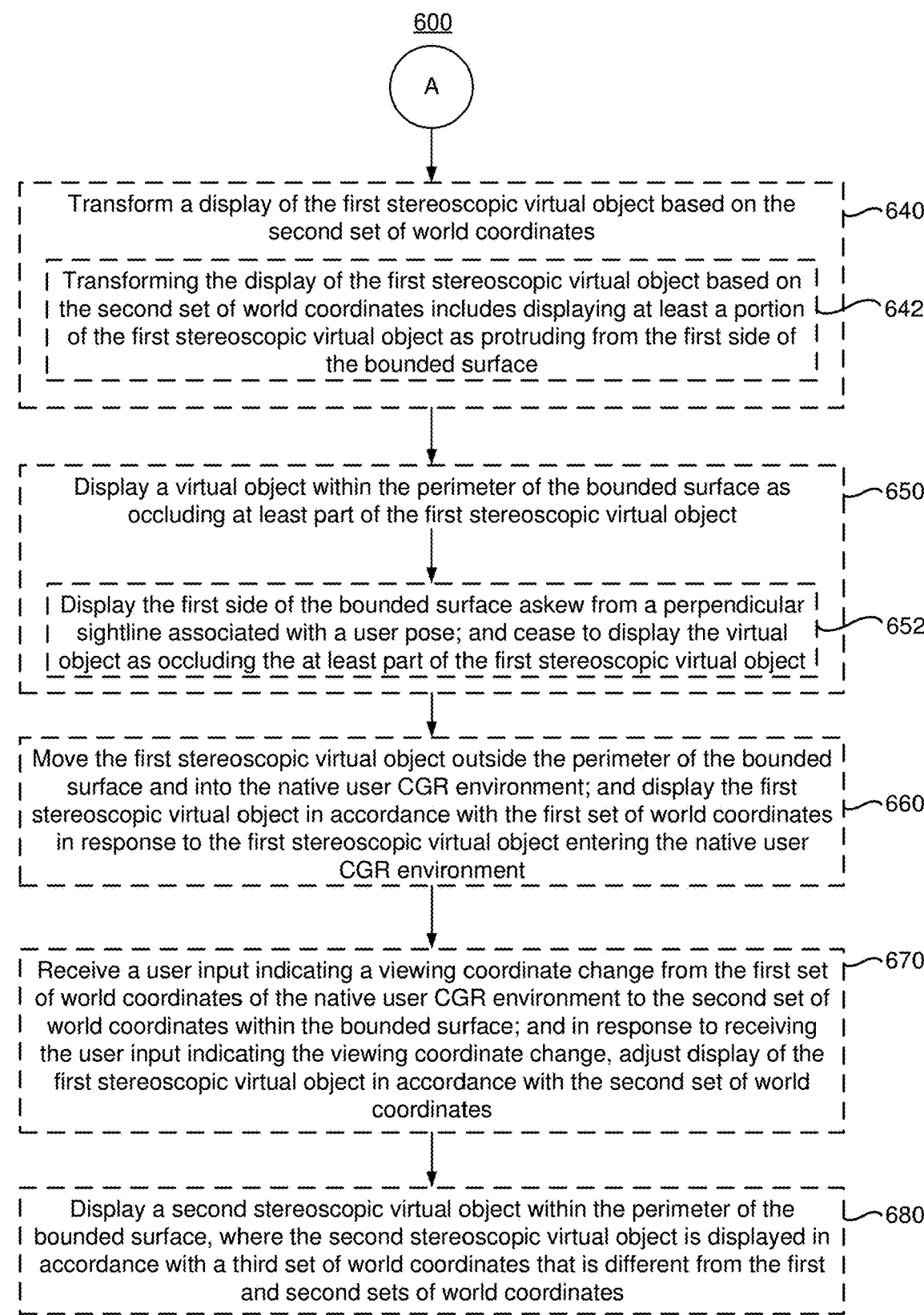

600

A

Transform a display of the first stereoscopic virtual object based on the second set of world coordinates — 640

Transforming the display of the first stereoscopic virtual object based on the second set of world coordinates includes displaying at least a portion of the first stereoscopic virtual object as protruding from the first side of the bounded surface — 642

Display a virtual object within the perimeter of the bounded surface as occluding at least part of the first stereoscopic virtual object — 650

Display the first side of the bounded surface askew from a perpendicular sightline associated with a user pose; and cease to display the virtual object as occluding the at least part of the first stereoscopic virtual object — 652

Move the first stereoscopic virtual object outside the perimeter of the bounded surface and into the native user CGR environment; and display the first stereoscopic virtual object in accordance with the first set of world coordinates in response to the first stereoscopic virtual object entering the native user CGR environment — 660

Receive a user input indicating a viewing coordinate change from the first set of world coordinates of the native user CGR environment to the second set of world coordinates within the bounded surface; and in response to receiving the user input indicating the viewing coordinate change, adjust display of the first stereoscopic virtual object in accordance with the second set of world coordinates — 670

Display a second stereoscopic virtual object within the perimeter of the bounded surface, where the second stereoscopic virtual object is displayed in accordance with a third set of world coordinates that is different from the first and second sets of world coordinates — 680

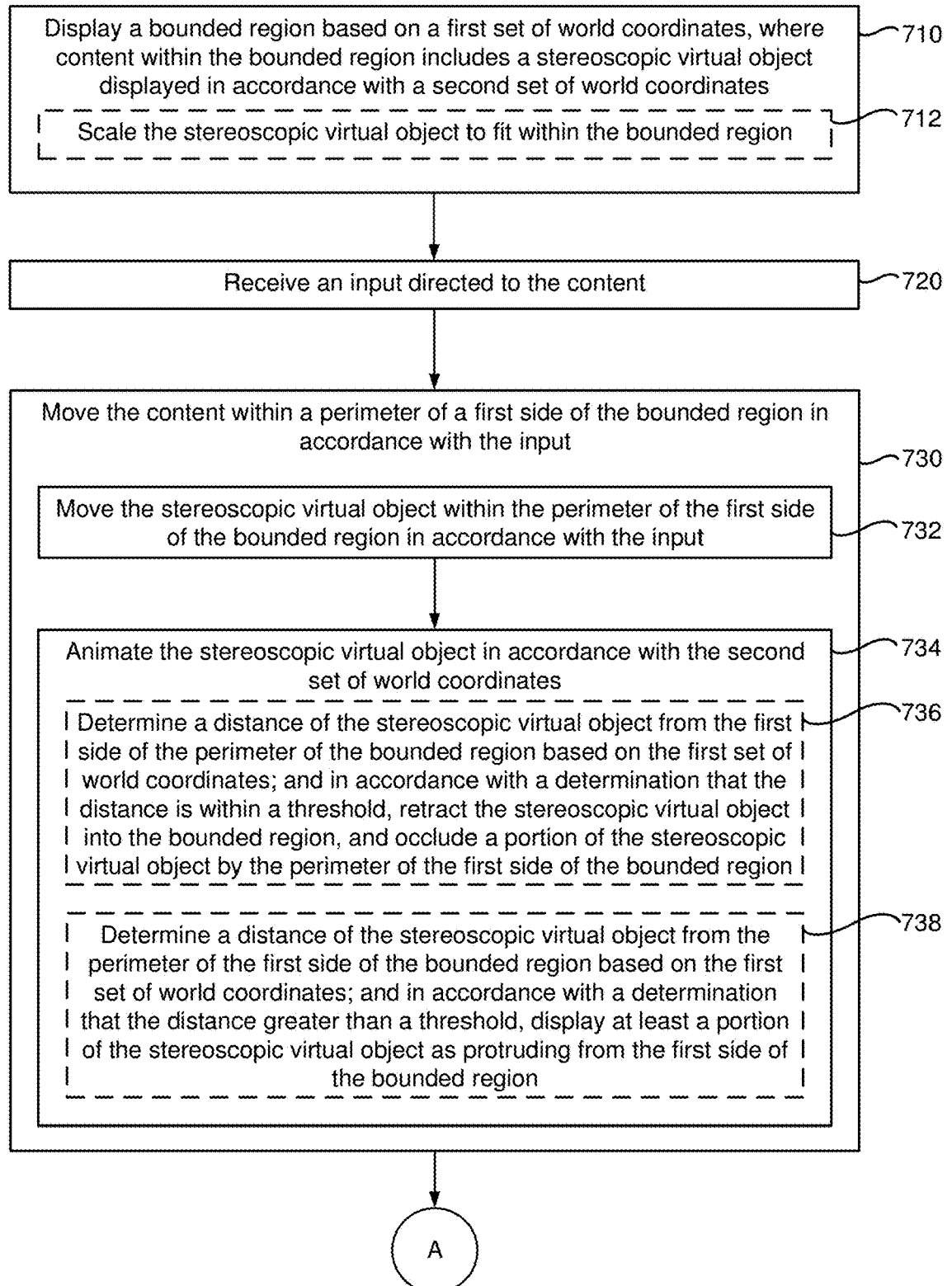

Display a bounded region based on a first set of world coordinates, where content within the bounded region includes a stereoscopic virtual object displayed in accordance with a second set of world coordinates — 710

Scale the stereoscopic virtual object to fit within the bounded region — 712

Receive an input directed to the content — 720

Move the content within a perimeter of a first side of the bounded region in accordance with the input — 730

Move the stereoscopic virtual object within the perimeter of the first side of the bounded region in accordance with the input — 732

Animate the stereoscopic virtual object in accordance with the second set of world coordinates — 734

Determine a distance of the stereoscopic virtual object from the first side of the perimeter of the bounded region based on the first set of world coordinates; and in accordance with a determination that the distance is within a threshold, retract the stereoscopic virtual object into the bounded region, and occlude a portion of the stereoscopic virtual object by the perimeter of the first side of the bounded region — 736

Determine a distance of the stereoscopic virtual object from the perimeter of the first side of the bounded region based on the first set of world coordinates; and in accordance with a determination that the distance greater than a threshold, display at least a portion of the stereoscopic virtual object as protruding from the first side of the bounded region — 738

VIRTUAL PAPER

CROSS-REFERENCE TO RELATED APPLICATIONS

This application is a continuation application of and claims priority to U.S. patent application Ser. No. 18/220, 684, filed on Jul. 11, 2023, which is a continuation application of and claims priority to U.S. patent application Ser. No. 17/707,025, filed on Mar. 29, 2022, which is a continuation application of and claims priority to U.S. patent application Ser. No. 16/821,102, filed on Mar. 17, 2020, which claims the benefit of U.S. Provisional Pat. App. No. 62/820,137, filed on Mar. 18, 2019, which are incorporated by reference in their entirety.

TECHNICAL FIELD

The present disclosure generally relates to computer-generated reality (CGR) applications on multifunction devices.

BACKGROUND

In previously available computer-generated reality (CGR) experiences, 2D virtual content and stereoscopic (or 3D) virtual content are typically displayed in accordance with one set of world coordinates characterizing a user CGR environment. In turn, the range of display and user interaction possibilities associated with both 2D and stereoscopic virtual content are limited to rendering and displaying the virtual content based on the set of world coordinates characterizing the user CGR environment.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 5A-5M illustrate examples of interactions with virtual content in an exemplary virtual paper in accordance with some embodiments.

FIGS. 6A and 6B represent a flowchart of a method for displaying a bounded surface in accordance with some embodiments.

FIGS. 7A and 7B represent a flowchart of a method for interacting with content displayed within a perimeter of a bounded region in accordance with some embodiments.

Figure 1A:
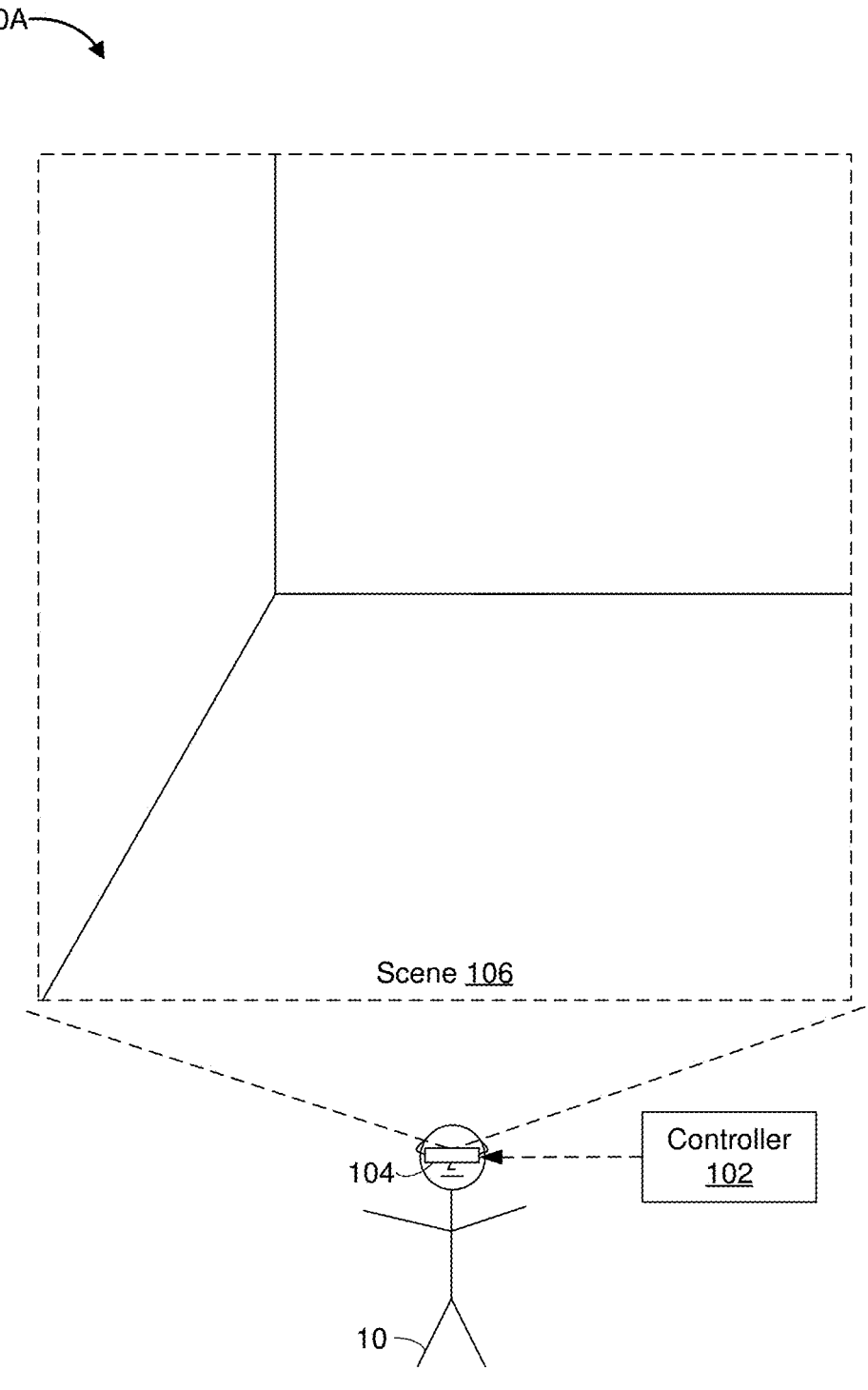
FIGS. 1A and 1B are diagrams of examples of operating environments in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various embodiments disclosed herein include devices, apparatuses, systems, and methods for intermingling stereoscopic and conforming virtual content to a virtual paper. In various embodiments, the method is performed at a device that includes one or more processors, a non-transitory memory, and one or more displays. The method includes displaying a bounded surface within a native user computer-generated reality (CGR) environment, wherein the bounded surface is displayed based on a first set of world coordinates characterizing the native user CGR environment. The method further includes displaying a first stereoscopic virtual object within a perimeter of a first side of the bounded surface, wherein the first stereoscopic virtual object is displayed in accordance with a second set of world coordinates that is different from the first set of world coordinates characterizing the native user CGR environment.

Various embodiments disclosed herein include devices, apparatuses, systems, and methods for interacting with virtual content in a virtual paper. In various embodiments, the method is performed at a device that includes one or more processors, a non-transitory memory, and one or more displays. The method includes displaying a bounded region based on a first set of world coordinates, wherein content within the bounded region includes a stereoscopic virtual object displayed in accordance with a second set of world coordinates. The method further includes receiving an input directed to the content. The method additional includes moving the content within a perimeter of the bounded region in accordance with the input, wherein the moving includes moving the stereoscopic virtual object within the perimeter of the bounded region in accordance with the input; and animating the stereoscopic virtual object in accordance with the second set of world coordinates.

In some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein. In some embodiments, a non-transitory computer readable storage medium has stored therein instructions, which, when executed by one or more processors of a device, cause the device to perform or cause performance of any of the methods described herein. In some embodiments, a device includes: one or more processors, a non-transitory memory, and means for performing or causing performance of any of the methods described herein.

DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

In contrast to the aforementioned previously available computer-generated reality (CGR) systems, various embodiments disclosed herein provide a multi-dimensional CGR environment. In some embodiments, the multi-dimensional CGR environment includes a display of a virtual paper that is represented as a bounded surface or a bounded region. In some embodiments, the bounded surface is displayed based on a first set of world coordinates characterizing a native user CGR environment. Further, within the bounded surface, stereoscopic virtual content is displayed based on a second set of world coordinates. In some embodiments, also displayed within the bounded surface is conforming virtual content (e.g., 2D virtual content in a sub-set of instances). The conforming virtual content conforms to a contour of the bounded surface based on the first set of world coordinates in accordance with some embodiments.

For example, while the 3D virtual content is displayed such that the 3D virtual content is bounded within the perimeter of the virtual paper, the 3D virtual content is able to protrude out from a first side of the virtual paper, and the display of the 3D virtual content is based on the second set of world coordinates. The 2D virtual content, on the other hand, is displayed as conforming to the surface of the virtual paper based on the first set of world coordinates. In some embodiments, a second side of the virtual paper, which is the opposite of the first side of the virtual paper (e.g., the backside), is displayed with a rasterized conforming representation of the 3D virtual content, e.g., a blur effect or shadow of the 3D virtual content, along with a rasterized conforming representation of the 2D virtual content.

The virtual paper in accordance with embodiments described herein not only improves how the virtual content is displayed in the CGR environment, but also how the virtual content is interacted with in the CGR environment. For instance, previously available display methods often display a portion of 2D content when there is more 2D content than can be displayed within a window (or an application) pane. In response to a scrolling input, bounds of the window or application pane would clip the 2D content at the border, so that another portion of the 2D content would be displayed within the bounds. In a CGR environment for presenting a bounded region within stereoscopic content, previously available systems and methods do not provide an efficient and elegant way to clip the stereoscopic virtual content that is intended to remain at least partially visible within the bounded region.

By contrast, various embodiments disclosed herein bind the stereoscopic (or 3D) virtual content within the perimeter of the bounded region. As such, in response to a scroll input that moves the stereoscopic virtual object beyond the perimeter of the bounded region, in some embodiments, the stereoscopic virtual object that initially protrudes out from a surface of a bounded region retracts to the opposite side of the surface of the bounded region. Further, in some embodiments, when a stereoscopic virtual object is too large to fit inside the native user CGR environment (e.g., an ocean liner), the stereoscopic virtual object is placed within the bounded region, which is characterized by the second set of world coordinates. Placing the stereoscopic virtual object within the bounded region enables the user to then peer through the surface of the bounded region in order to view the stereoscopic virtual object at full-scale and from an appropriate distance.

FIG. 1A is a block diagram of an example of a computer-generated reality (CGR) environment 100A in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein.

As described herein, a physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell. In contrast, a CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

As used herein, a virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

As used herein, an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

As used herein, an augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

As used herein, an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

To that end, as a non-limiting example, the CGR environment 100A includes a controller 102 and a CGR device (e.g., a head-mountable device (HMD)) 104. In the example of FIG. 1, the CGR device 104 is worn by a user 10. In some embodiments, the CGR device 104 corresponds to a head-mountable device (HMD), tablet, mobile phone, wearable computing device, or the like. In some embodiments, the CGR device 104 is configured to present a CGR experience to the user 10. In some embodiments, the CGR device 104 includes a suitable combination of software, firmware, and/ or hardware.

According to some embodiments, the CGR device 104 presents the CGR experience to the user 10 while the user 10 is virtually and/or physically present within a scene 106. In some embodiments, while presenting the CGR experience, the CGR device 104 is configured to present CGR content and to enable video pass-through of the scene 106 (e.g., the CGR device 104 corresponds to an AR-enabled mobile phone or tablet). In some embodiments, while presenting an AR experience, the CGR device 104 is configured to present AR content and to enable optical see-through of the scene 106 (e.g., the CGR device 104 corresponds to an AR-enabled glasses). In some embodiments, while presenting a virtual reality (VR) experience, the CGR device 104 is configured to present VR content and to optionally enable video pass-through of the scene 106 (e.g., the CGR device 104 corresponds to a VR-enabled HMD).

In some embodiments, the user 10 wears the CGR device 104 on his/her head (e.g., as shown in FIG. 1). As such, the CGR device 104 includes one or more displays provided to display the CGR content. For example, the CGR device 104 encloses the field-of-view of the user 10. In some embodiments, the CGR device 104 is replaced with a CGR (e.g., an AR/VR) chamber, enclosure, or room configured to present the CGR content in which the user 10 does not wear the CGR device 104. In some embodiments, the user 10 holds the CGR device 104 in his/her hand(s).

In some embodiments, the controller 102 is configured to manage and coordinate the CGR experience for the user 10. In some embodiments, the controller 102 includes a suitable combination of software, firmware, and/or hardware. In some embodiments, the controller 102 is a computing device that is local or remote relative to the scene 106. For example, the controller 102 is a local server located within the scene 106. In another example, the controller 102 is a remote server located outside of the scene 106 (e.g., a cloud server, central server, etc.). In some embodiments, the controller 102 is communicatively coupled with the CGR device 104 via one or more wired or wireless communication channels (e.g., BLUETOOTH, IEEE 802.11x, IEEE 802.16x, IEEE 802.3x, etc.). In some embodiments, the functionalities of the controller 102 are provided by and/or combined with the CGR device 104.

As illustrated in FIG. 1A, the CGR device 104 presents a scene 106. In some embodiments, the scene 106 is generated by the controller 102 and/or the CGR device 104. In some embodiments, the scene 106 includes a virtual scene that is a simulated replacement of a real-world scene. In other words, in some embodiments, the scene 106 is simulated by the controller 102 and/or the CGR device 104. In such embodiments, the scene 106 is different from the real-world scene where the CGR device 104 is located. In some embodiments, the scene 106 includes an augmented scene that is a modified version of a real-world scene. For example, in some embodiments, the controller 102 and/or the CGR device 104 modify (e.g., augment) the real-world scene where the CGR device 104 is located in order to generate the scene 106. In some embodiments, the controller 102 and/or the CGR device 104 generate the scene 106 by simulating a replica of the real-world scene where the CGR device 104 is located. In some embodiments, the controller 102 and/or the CGR device 104 generate the scene 106 by removing and/or adding items from the simulated replica of the real-world scene where the CGR device 104 is located.

Figure 1B:
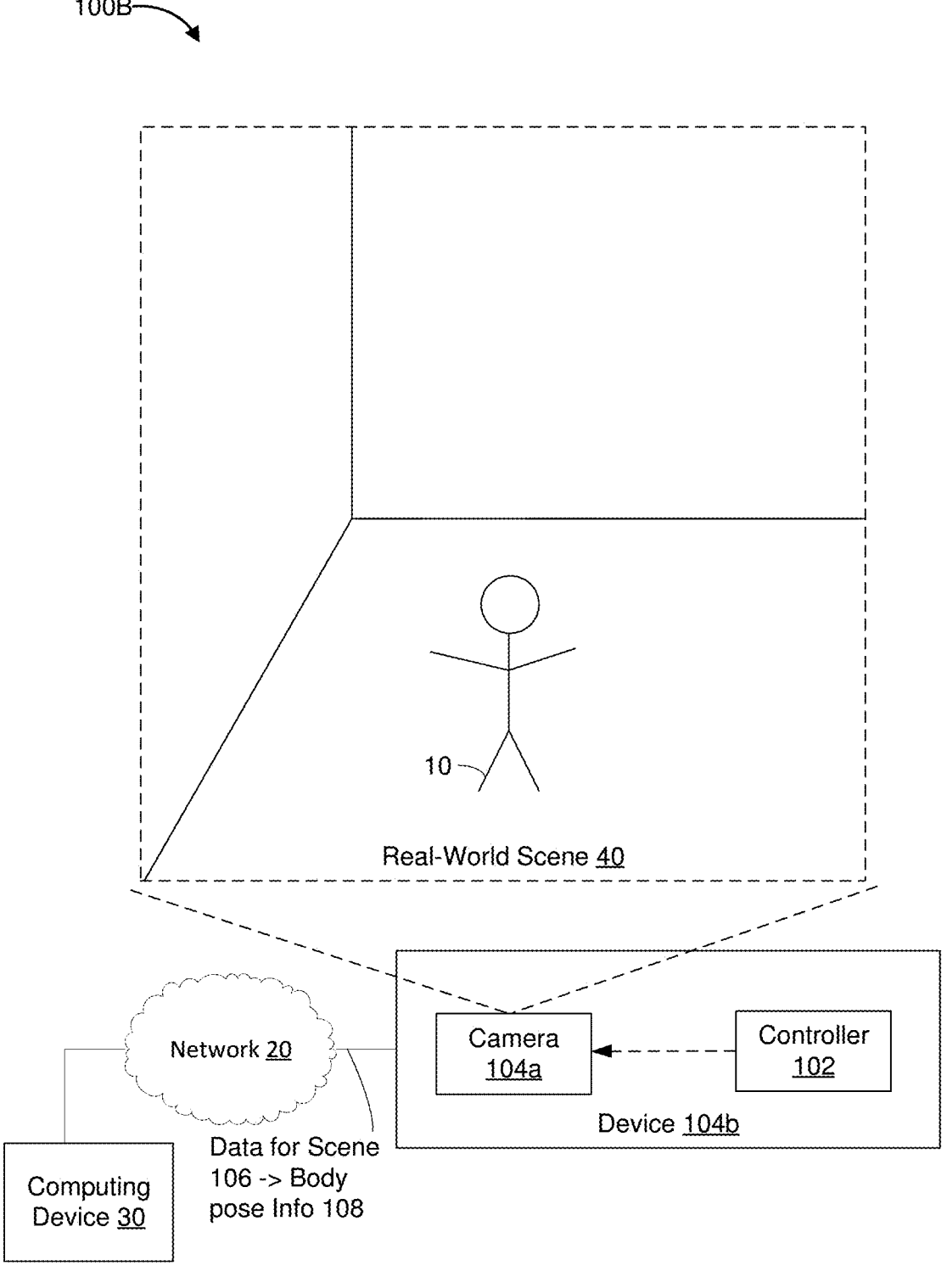

Referring to FIG. 1B, FIG. 1B is a diagram of an example operating environment 100B in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the operating environment 100B includes a network 20, a computing device 30, a real-world scene 40, and a device 104b.

In the example of FIG. 1B, the real-world scene 40 includes the user 10. In various embodiments, the device 104b captures a set of images of the real-world scene 40 and transmits data representing the scene 106 to the computing device 30 over the network 20. In some embodiments, the device 104b includes the controller 102 and a camera 104a. In some embodiments, the camera 104a captures the set of images, and the controller 102 generates the data representing the scene 106 based on the set of images. In some embodiments, the data representing the scene 106 includes body pose information 108 for the user 10 that is in a field of view of the camera 104a.

In various embodiments, the body pose information 108 indicates body poses of the user 10 that is in the field of view of the camera 104a. For example, in some embodiments, the body pose information 108 indicates joint positions and/or joint orientations of the user 10 (e.g., positions/orientations of shoulder joints, elbow joints, wrist joints, pelvic joint, knee joints, and ankle joints). In some embodiments, the body pose information 108 indicates positions/orientations of various body portions of the user 10 (e.g., positions/orientations of head, torso, upper arms, lower arms, upper legs and lower legs).

In various embodiments, transmitting the body pose information 108 over the network 20 consumes less bandwidth than transmitting images captured by the camera 104a. In some embodiments, network resources are limited, and the device 104b has access to an available amount of bandwidth. In such embodiments, transmitting the body pose information 108 consumes less than the available amount of bandwidth, whereas transmitting images captured by the camera 104a would consume more than the available amount of bandwidth. In various embodiments, transmitting the body pose information 108 (e.g., instead of transmitting images) improves the operability of the network 20 by, for example, utilizing fewer network resources (e.g., by utilizing less bandwidth).

In some embodiments, the computing device 30 utilizes the body pose information 108 to render an avatar of the user 10. For example, the computing device 30 can provide the body pose information 108 to a display engine (e.g., a rendering and display pipeline) that utilizes the body pose information 108 in order to render the avatar in a virtual scene. Since the computing device 30 utilizes the body pose information 108 to render the avatars, the body pose of the avatars is within a degree of similarity to the body pose of the user 10 at the real-world scene 40. As such, viewing the avatar in the virtual scene is within a degree of similarity to viewing the images of the real-world scene 40.

Figure 2:
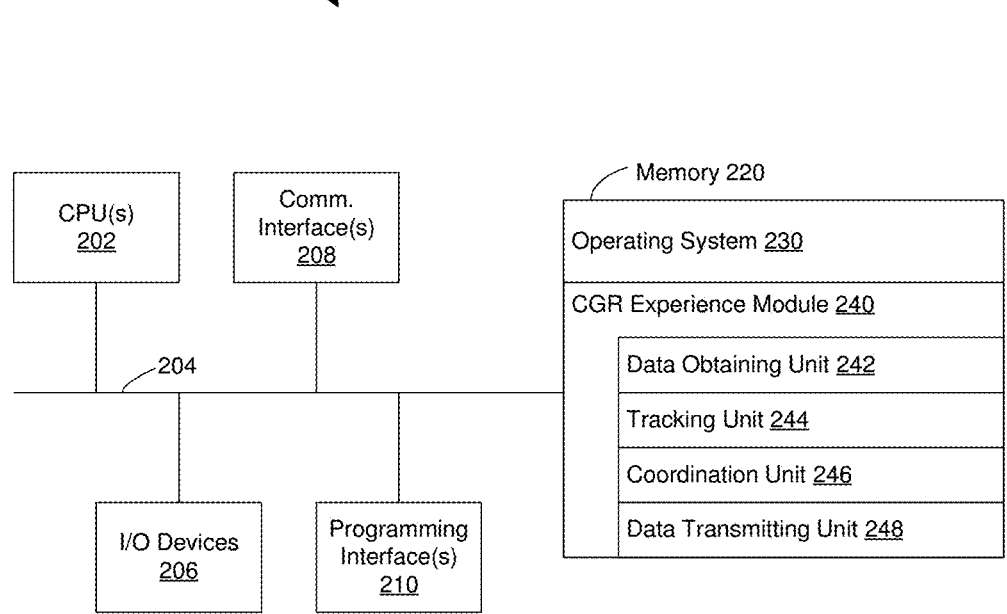
FIG. 2 is a block diagram of an example controller in accordance with some embodiments.

FIG. 2 is a block diagram of an example of the controller 102 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the controller 102 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the CGR device 104. To that end, in various embodiments, the data obtaining unit 242 includes instructions and/or logic therefor, and heuristics and metadata therefor.

In some embodiments, the tracking unit 244 is configured to map the scene 106 and to track the position/location of at least the CGR device 104 with respect to the scene 106 (FIG. 1A). To that end, in various embodiments, the tracking unit 244 includes instructions and/or logic therefor, and heuristics and metadata therefor.

In some embodiments, the coordination unit 246 is configured to manage and coordinate the CGR experience presented to the user by the CGR device 104. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the CGR device 104. To that end, in various embodiments, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 102), it should be understood that in other embodiments, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular embodiment as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

Figure 3:
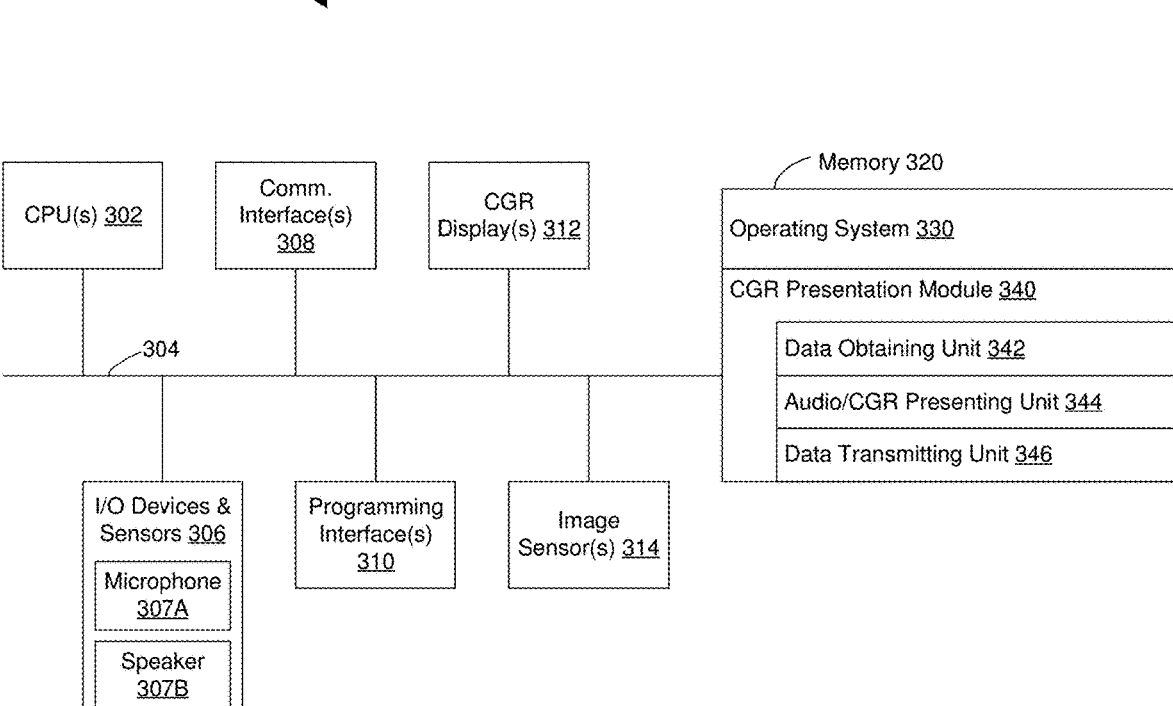
FIG. 3 is a block diagram of an example computer-generated reality (CGR) device in accordance with some embodiments.

FIG. 3 is a block diagram of an example of the CGR device 104 (FIG. 1A) in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the CGR device 104 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B (e.g., headphones or loudspeakers), a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic waveguide displays and/or the like. For example, the CGR device 104 includes a single CGR display. In another example, the CGR device 104 includes a CGR display for each eye of the user. In some embodiments, the one or more CGR displays 312 are capable of presenting CGR content.

In some embodiments, the one or more interior, exterior, inward, outward, front, and/or back facing image sensors 314 are configured to obtain image data that corresponds to at least a portion of the face of the user that includes the eyes of the user (any may be referred to as an eye-tracking camera). In some embodiments, the one or more interior, exterior, inward, outward, front, and/or back facing image sensors 314 are configured to be forward-facing (or outward facing) so as to obtain image data that corresponds to the scene as would be viewed by the user if the CGR device 104 was not present (and may be referred to as an outward facing camera). The one or more interior, exterior, inward, outward, front, and/or back facing image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330, and a CGR presentation module 340.

The operating system 330 includes procedures for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, an audio/CGR presenting unit 344, and a data transmitting unit 346.

In some embodiments, the data obtaining unit 342 is configured to obtain data (e.g., presentation data, interaction data, sensor data, location data, etc.) from one or more of the controller 102 (e.g., via the one or more communication interfaces 308), the one or more I/O devices and sensors 306, or the one or more interior, exterior, inward, outward, front, and/or back facing image sensors 314. To that end, in various embodiments, the data obtaining unit 342 includes instructions and/or logic therefor, and heuristics and metadata therefor.

In some embodiments, the audio/CGR presenting unit 344 is configured to present an audio/CGR experience via the one or more CGR displays 312 (and, in various embodiments, the speaker 307B and/or microphone 307A). To that end, in various embodiments, the audio/CGR presenting unit 344 includes instructions and/or logic therefor, and heuristics and metadata therefor.

In some embodiments, the data transmitting unit 346 is configured to transmit data (e.g., presentation data, location data, etc.) to at least the controller 102. To that end, in various embodiments, the data transmitting unit 346 includes instructions and/or logic therefor, and heuristics and metadata therefor.

Although the data obtaining unit 342, the audio/CGR presenting unit 344, and the data transmitting unit 346 are shown as residing on a single device (e.g., the CGR device 104), it should be understood that in other embodiments, any combination of the data obtaining unit 342, the audio/CGR presenting unit 344, and the data transmitting unit 346 may be located in separate computing devices.

Moreover, FIG. 3 is intended more as a functional description of the various features that could be present in a particular embodiment as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

Figure 4A:
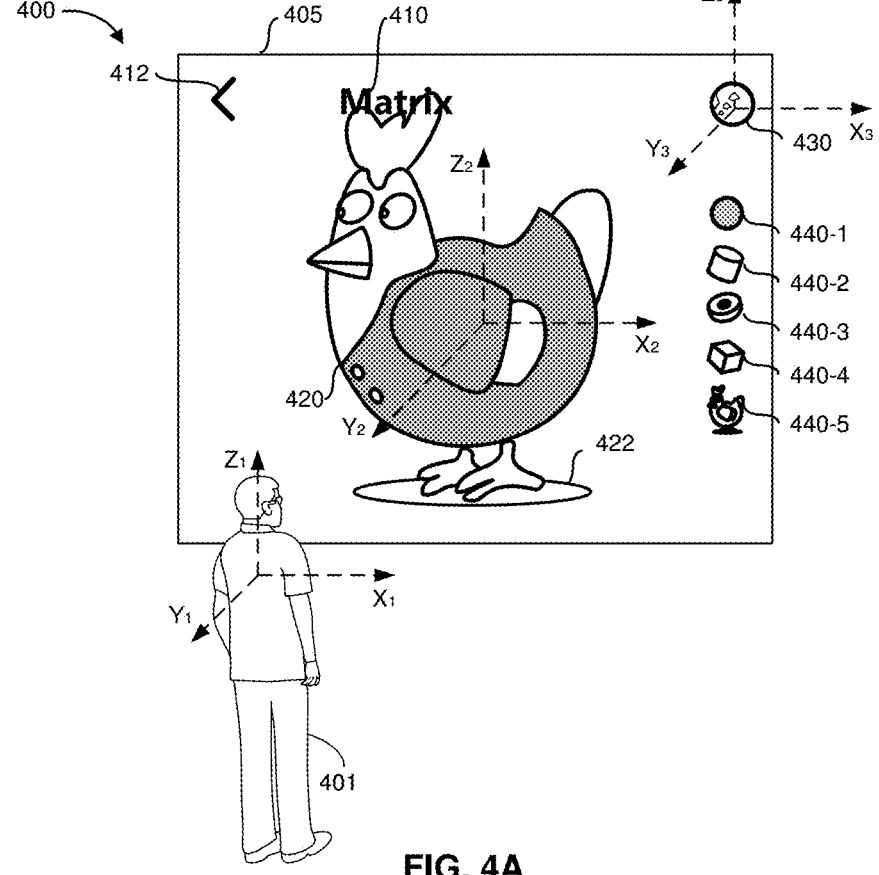
FIGS. 4A-4O illustrate examples of virtual papers in accordance with some embodiments.

FIG. 4A illustrates an example of a CGR environment 400 in which a first side (e.g., a front side) of a virtual paper 405 is displayed in accordance with some embodiments. In some embodiments, the CGR environment 400 is a native user CGR environment. In some embodiments, a native user CGR environment is a CGR environment in which a user or an avatar representing the user is located. For example, the CGR environment 400 includes a user 401 or an avatar representing the user 401. As such, the scene depicted in FIG. 4A can be a view of the CGR environment 400 from the perspective of the user 401 or a bystander.

In some embodiments, within the native user CGR environment 400, the virtual paper 405 is displayed as a bounded surface, e.g., a virtual surface with edges or bounds around the perimeter of the virtual surface. As such, the virtual paper 405 is also sometimes referred to hereinafter as the bounded surface 405. In some embodiments, the bounded surface 405 is displayed in accordance with a first set of world coordinates characterizing the native user CGR environment 400. In some embodiments, a world coordinate system characterizing the native user CGR environment 400 is the main or universal coordinate system of a scene depicting the native user CGR environment 400. For example, in a typical Cartesian coordinate system, there is one origin for the world, with X, Y, and Z axes. In the native user CGR environment 400, the axes $X_1$, $Y_1$, and $Z_1$ roughly correspond to right/left, up/down, and forward/backward, respectively, as if the user 401 or the avatar representing the user 401 is located and aligned at the origin as shown in FIG. 4A. As such, positions of objects in the native user CGR environment 400 can be described by the set of world coordinates characterizing the native user CGR environment 400, e.g., $(X_1, Y_1, Z_1)$. In other words, positions of objects, including the virtual paper 405, are displayed in the native user CGR environment 400 as if from the perspective of the user 401 or the avatar representing the user 401.

In some embodiments, at least one stereoscopic virtual object (e.g., a 3D chicken 420, a 3D sphere object 430, and/or 3D toolbox objects 440) is displayed within the perimeter of the front side of the virtual paper 405. In some embodiments, the at least one stereoscopic virtual object 420-440 is displayed in accordance with a set of world coordinates, e.g., displaying the 3D chicken 420 in accordance with the set of world coordinates $(X_2, Y_2, Z_2)$ or displaying the 3D toolbox objects 440 in accordance with the set of world coordinates $(X_3, Y_3, Z_3)$. Though not shown in FIG. 4A, each of the 3D toolbox objects 440 can be displayed according to its own set of world coordinates.

In some embodiments, the sets of world coordinates $(X_2, Y_2, Z_2)$ and $(X_3, Y_3, Z_3)$ are different from the set of world coordinates $(X_1, Y_1, Z_1)$ that characterizes the native user CGR environment 400. Accordingly, as will be detailed below, each of the stereoscopic virtual objects 420-440 can be moved in accordance with respective sets of world coordinates, and the virtual paper 405 and the virtual objects displayed within the virtual paper 405 can animate according to respective sets of world coordinates. In some other embodiments, the set of world coordinates $(X_2, Y_2, Z_2)$ or $(X_3, Y_3, Z_3)$ is the same as the set of world coordinates $(X_1,$ $Y_1$, $Z_1$) characterizing the native user CGR environment 400. In other words, the sets of world coordinates ($X_1$, $Y_1$, $Z_1$), ($X_2$, $Y_2$, $Z_2$), and/or ($X_3$, $Y_3$, $Z_3$) are bridgeable or disjoint.

In some embodiments, also displayed within the perimeter of the virtual paper 405 are conforming virtual objects, e.g., 2D text "Matrix" 410 and an affordance "<" 412. The 2D text "Matrix" 410 and the affordance 412 are displayed as conforming to a contour and/or surface of the virtual paper 405. Because the conforming virtual objects 410 and 412 conform to the contour and/or surface of the virtual paper 405, which is characterized by the first set of world coordinates ($X_1$, $Y_1$, $Z_1$), and the 3D chicken 420 is displayed in accordance with the second set of world coordinates ($X_2$, $Y_2$, $Z_2$), these virtual objects 410, 412, and 420 may occlude each other. As shown in FIG. 4A, the 2D text "Matrix" 410 appears to be floating on the surface of the front side of the virtual paper 405, and the 3D chicken 420 appears to be inside the virtual paper 405. As such, the 2D text "Matrix" 410 appears to be in front of (e.g., overlaid on) the 3D chicken 420 from the perspective of the user 401. Accordingly, the 2D text "Matrix" 410 occludes part of the crest of the 3D chicken 420 inside the virtual paper 405.

The virtual paper 405 displayed in the CGR environment 400 is different from a virtual paper in previously existing systems. When constrained to a conventional 3D space, 3D virtual objects are typically displayed in front of (or on top of) the sheet of paper. As such, in conventional 3D space, the 3D virtual objects would occlude other content (e.g., text) on the virtual paper. In contrast, as will be described below in detail, the virtual paper 405 can be a portal from the native user CGR environment 400 characterized by the set of world coordinates ($X_1$, $Y_1$, $Z_1$) to another 3D world, e.g., the 3D world characterized by the set of world coordinates ($X_2$, $Y_2$, $Z_2$). As such, the stereoscopic virtual objects 420-440 are inserted into the virtual paper 405, and displayed as inside the virtual paper 405. This allows the stereoscopic virtual objects 420-440 to coexist with the associated text (e.g., the 2D text "Matrix" 410 or the affordance 412) for easy reading, thereby providing a visually-pleasing page layout.

In some embodiments, different world lightings illuminate different virtual objects. In some embodiments, one light source illuminates one set of virtual objects within and inside (e.g., within a threshold distance from the surface of the virtual paper) the virtual paper 405, while a different light source illuminates virtual objects close to or on the surface of the virtual paper 405. In FIG. 4A, a light source above the 3D chicken 420, which is a stereoscopic virtual object displayed within and inside the virtual paper 405 in accordance with the second set of world coordinates ($X_2$, $Y_2$, $Z_2$), causes a shadow 422 underneath the 3D chicken 420. In contrast, the stereoscopic virtual object 430, which is close to the surface of the virtual paper 405 (e.g., within a threshold distance from the surface of the virtual paper 405), does not have a shadow underneath. Further, as shown by a portion of the stereoscopic virtual object 430, e.g., the shiny surface protruding from the surface of the virtual paper 405, the stereoscopic virtual object 430 may be illuminated by a light source in the native user CGR environment 400 characterized by the first set of world coordinates ($X_1$, $Y_1$, $Z_1$). In particular, the shiny surface with small, intense, and specular highlights shows that the highlights are caused by diffuse reflection from the light source in the native user CGR environment 400.

It should be noted that FIG. 4A illustrates one example of world lighting. In some other embodiments, virtual objects displayed within the virtual paper 405 share the same world lighting. Further, in some embodiments, the same light source illuminates both the virtual paper 405 and the native user CGR environment 400. In such embodiments, the same light source, e.g., a point, spot, directional, area, volume, ambient light, etc., can provide lighting effect according to multiple world coordinates. For instance, the user 401, the 2D text "Matrix" 410, the affordance 412, and the stereoscopic virtual objects 420-440 can share one world lighting and the effects of such lighting may differ in accordance various world coordinates.

Figure 4B:
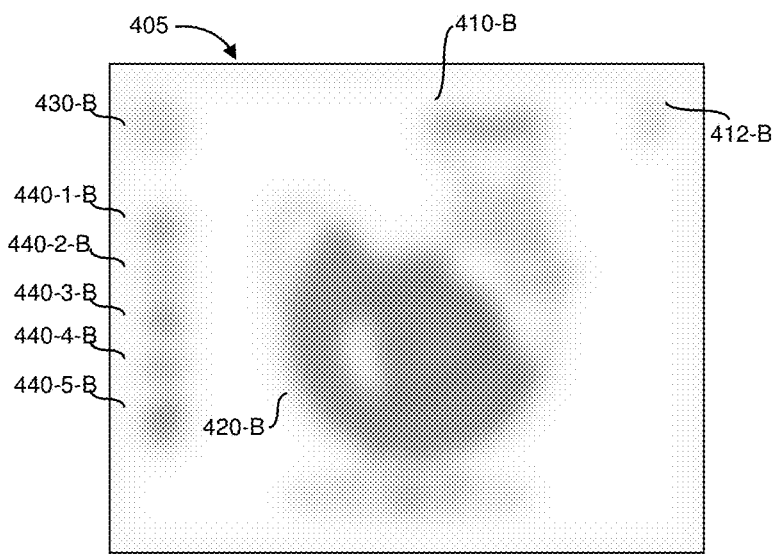

In some embodiments, the virtual paper 405 shown in FIG. 4A has a second side, e.g., a backside. FIG. 4B illustrates a backside of the virtual paper 405 in accordance with some embodiments. In some embodiments, the backside of the virtual paper 405 includes a rasterized conforming representation of the stereoscopic virtual object. As known in the art, rasterizing is the process of turning graphics components into a bitmap image made of pixels. In case the graphics components are 3D objects, the 3D objects are converted into a 2D image of the object. For example, the 3D chicken 420 on the front side of the virtual paper 405 (FIG. 4A) is rasterized, and a 2D representation 420-B of the 3D chicken 420 is generated and displayed on the backside as shown in FIG. 4B. Likewise, the 3D sphere object 430 and the 3D toolbox objects 440-1, 440-2, 440-3, 440-4, and 440-5 on the front side of the virtual paper 405 (FIG. 4A) are also rasterized, and 2D representations 430-B, 440-1-B, 440-2-B, 440-3-B, 440-4-B, and 440-5-B of the 3D content are generated and displayed on the backside as shown in FIG. 4B.

In some embodiments, the virtual paper 405 is semitransparent. In some embodiments, the rasterized conforming representations 420-B, 430-B, 440-1-B, 440-2-B, 440-3-B, 440-4-B, and 440-5-B are blurred on the backside of the virtual paper 405. In addition to blurring the rasterized conforming representations of 3D content, the backside of the virtual paper 405 also includes blurred 2D content, such as the blurred 2D text "Matrix" 410-B and the blurred 2D navigation affordance 412-B. The blurring of the content from the front side of the virtual paper 405 creates the effect that the translucent virtual paper 405 exists in the native user CGR environment of the user 401, while still hinting at the content on the front side of the virtual paper 405.

Figures 4C, 4D, 4E:
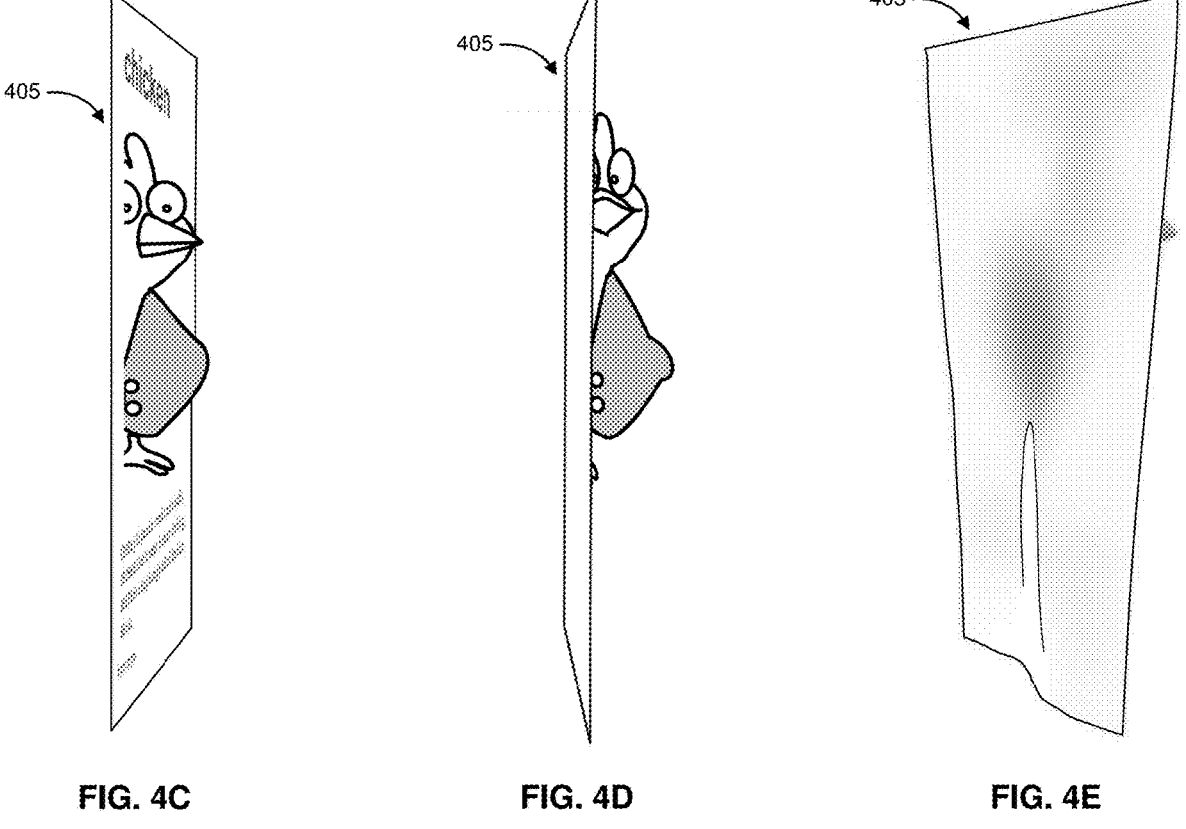
Figure 4F:
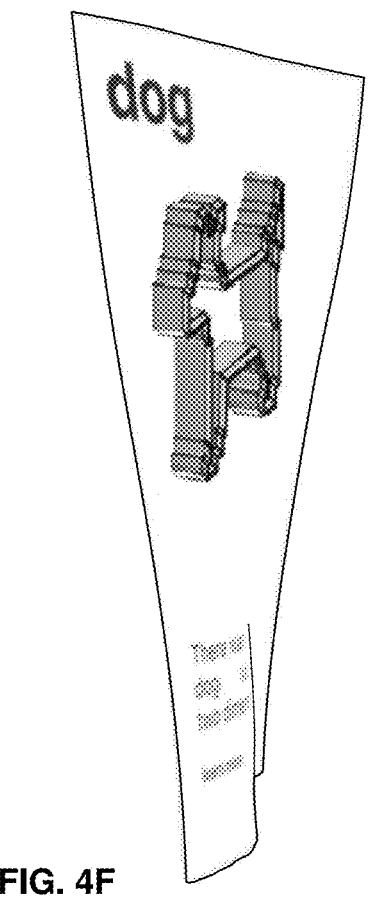
Figure 4G:
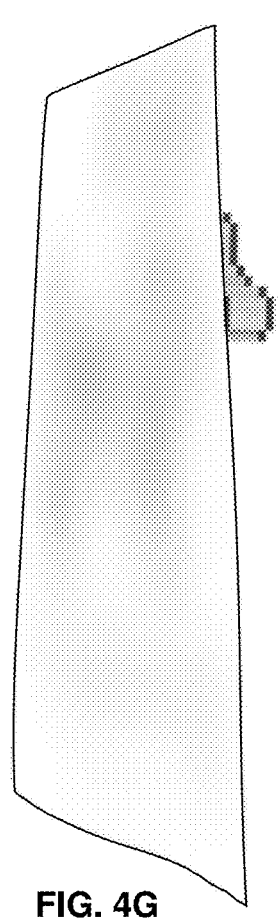

In some embodiments, the display of the virtual paper 405 can be transformed in response to an input directed to the virtual paper 405. For example, the input can be a user placing, twisting, swinging, flinging, turning, flipping, rotating, bending, curling, and/or folding the virtual paper 405. In response to receiving the input, the contour of the virtual paper 405 changes in some embodiments. For example, as shown in FIGS. 4C-4E, the virtual paper 405 is wrinkled when being turned from the front to the back, e.g., the contour of the virtual paper 405 has curves. In another example, as shown in FIGS. 4F and 4G, the virtual paper 405 is twisted or warped while being turned from the front side to the back side. As such, the display of the virtual paper 405 is transformed from a flat surface to a curved surface with certain parts of the curved surface being occluded by other parts of the curved surface. For example, in FIG. 4F, a portion of the 2D text is occluded by a portion of the curved surface of the virtual paper 405.

In some embodiments, the input to the virtual paper 405 is not limited to movements of the virtual paper 405, such that the input from the user 401 directed to the virtual paper 405 includes a body pose change of the user 401. For example, the body pose change of the user 401 can include the user 401 walking to the backside of the virtual paper 405 and/or tilting the CGR device (e.g., the device 104 in FIG. 1A or a mobile device) to view the virtual paper 405 from a different angle. In some embodiments, the input is acquired through the I/O devices and sensors 306 and/or the one or more communication interfaces 308 of the CGR device 104 (FIG. 3), e.g., the user clicking a button or an affordance, the user giving voice commands, or receiving the input from a remote device through the one or more communication interfaces 308.

As show in FIGS. 4C-4G, during the transformation of the display of the virtual paper 405, the display of the virtual contents associated with the virtual paper 405 also transforms in response to transforming the contour of the virtual paper 405. For example, parts of the 3D chicken are protruding from one side of the virtual paper 405 (FIGS. 4C-4E) and parts of the 3D dog are protruding from one side of the virtual paper 405 (FIGS. 4F and 4G), as if flinging the 3D chicken or 3D dog in response to the swinging of the virtual paper 405. In addition, the text on the virtual paper 405 also transforms, e.g., the text "Chicken" is slanted in FIG. 4C and the paragraph of text below the 3D dog appears to be curved in FIG. 4F. These transformations are described in further detail below with reference to FIGS. 4H-4M.

Figures 4H, 4I, 4J, 4K:
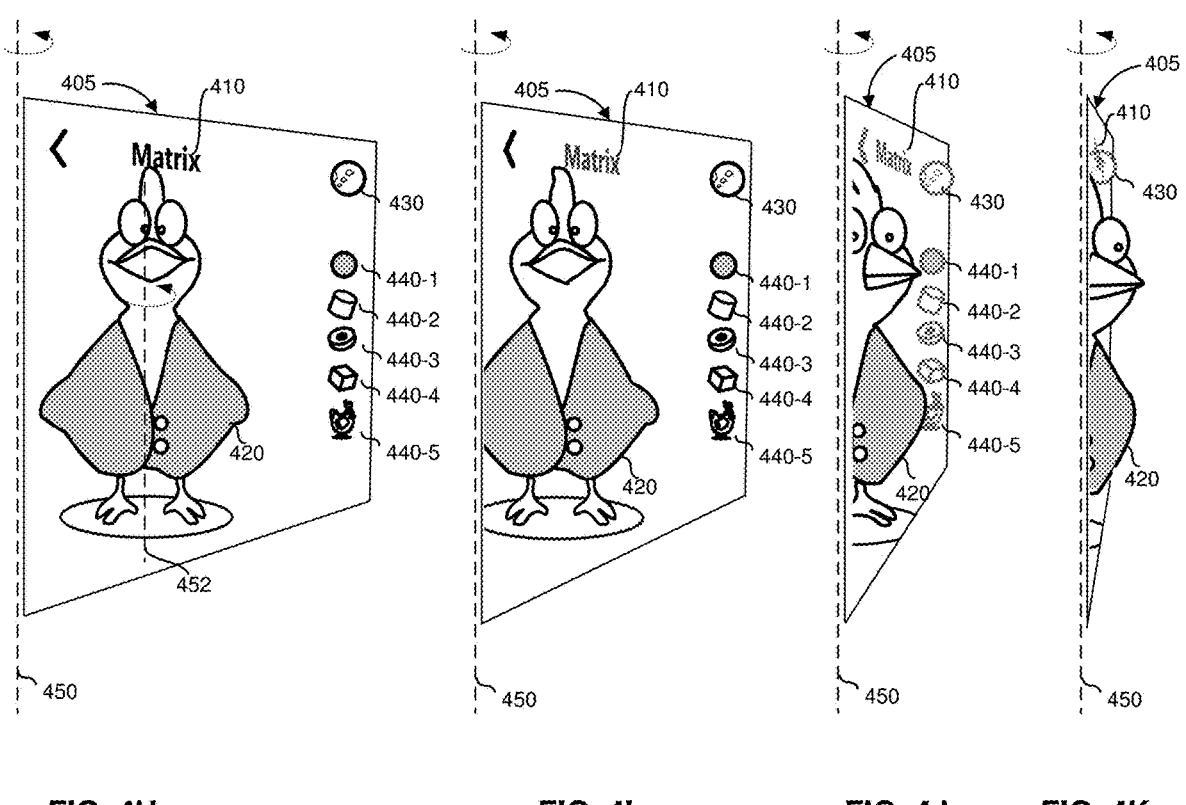

Turning to FIGS. 4H-4K, FIGS. 4H-4K illustrate the transformation of the display of the virtual paper 405 in response to an input rotating the virtual paper 405 in accordance with some embodiments. In FIG. 4H, in response to the input as indicated by the dotted arrow, the display of the virtual paper 405 is transformed and the contour of the virtual paper changes. For example, the right vertical edge of the virtual paper 405 appears to be shorter and the top and bottom edges of the virtual paper 405 are slanted, as if the virtual paper 405 is rotated or swung away from the user 401 (not shown). As shown in FIGS. 4I-4K, as the virtual paper 405 further rotates around the vertical axis 450, the right vertical edge of the virtual paper 405 becomes shorter and shorter and the top and bottom edges of the virtual paper 405 are further slanted.

In addition to transforming the display of the virtual paper 405, the display of the conforming virtual objects within the perimeter of the virtual paper 405 concurrently transforms. Despite the changes in the display of the conforming virtual objects, the display of conforming virtual objects still conforms to the display of the virtual paper 405. For example, in FIG. 4A, the conforming virtual object, e.g., the 2D text "Matrix" 410 is displayed as being parallel to the top edge of the virtual paper 405. As the virtual paper 405 rotates around the vertical axis 450, the 2D text "Matrix" 410 appears to be slanted in FIGS. 4H-4K, which is consistent with the display of the virtual paper 405.

As explained above with reference to FIG. 4A, the virtual paper 405 is displayed in accordance with one set of world coordinates ($X_1$, $Y_1$, $Z_1$), while the stereoscopic virtual objects 420-440 are displayed in accordance with different sets of world coordinates. Accordingly, when the virtual paper 405 rotates along a vertical axis 450 in the set of world coordinates ($X_1$, $Y_1$, $Z_1$), the display of the virtual paper 405 transforms based on the set of world coordinates ($X_1$, $Y_1$, $Z_1$). In contrast, the display of the stereoscopic virtual objects transforms based on different set(s) of world coordinates.

For example, as shown in FIGS. 4H-4K, while the virtual paper 405 rotates, in addition to the appearance of being carried away from the user (not shown) by the virtual paper 405, the 3D chicken 420 rotates around a different axis 452 in accordance with a different set of world coordinates. Moreover, as shown in FIG. 4K, in some embodiments, the transformation of the 3D virtual objects 420-440 includes protruding at least a portion of the 3D virtual objects 420-440 from the front side of the virtual paper 405 based on the different sets of world coordinates. For example, as the 3D chicken 420 rotates around the different axis 452 based on the second set of world coordinates ($X_2$, $Y_2$, $Z_2$), the beak, part of head, and part of the wing covered in jacket of the 3D chicken 420 protrude out of the front side of the virtual paper 405, as shown in FIG. 4K. Likewise, a portion of the 3D sphere object 430 protrudes out of the front side of the virtual paper 405, as shown in FIGS. 4J and 4K.

In some embodiments, virtual objects displayed within the perimeter of the first side of the virtual paper 405 occlude one another. For example, in FIG. 4A, the user 401 is shown as standing in front of the virtual paper 405. As such, the virtual paper 405 is displayed as from a near perpendicular sightline associated with a user pose of the user 401. From the near perpendicular sightline, the 2D text "Matrix" 410 appears to be in front of the 3D chicken 420 and occludes parts of the 3D chicken 420. In FIGS. 4H and 4I, as the virtual paper 405 is displayed askew from the near perpendicular sightline associated with the user pose of the user 401, the 2D text "Matrix" 410 appears to be floating on top of the 3D chicken 420. Further, in FIGS. 4H and 4I, although the crest of the 3D chicken 420 is still occluded by the 2D text "Matrix" 410, the occlusion diminishes as the virtual paper 405 rotates around the vertical axis 450. In FIG. 4J, as the virtual paper 405 rotates further, an angled view of the volumetric region is displayed, such that the 2D text "Matrix" 410 no longer occludes the crest of the 3D chicken 420. Instead, the 2D text "Matrix" 410 is displayed as being on the side of the crest of the 3D chicken 420 to reveal virtual contents within the virtual paper 405. Also shown in FIG. 4J, the rest of the 3D chicken 420, which is inside the virtual paper 405, disappears behind bounds of the virtual paper 405 by nature of occlusion.

Figure 4L:
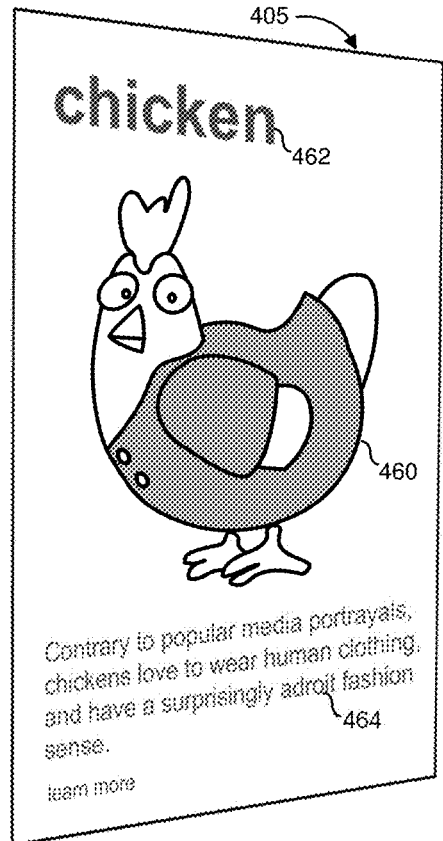
Figure 4M:
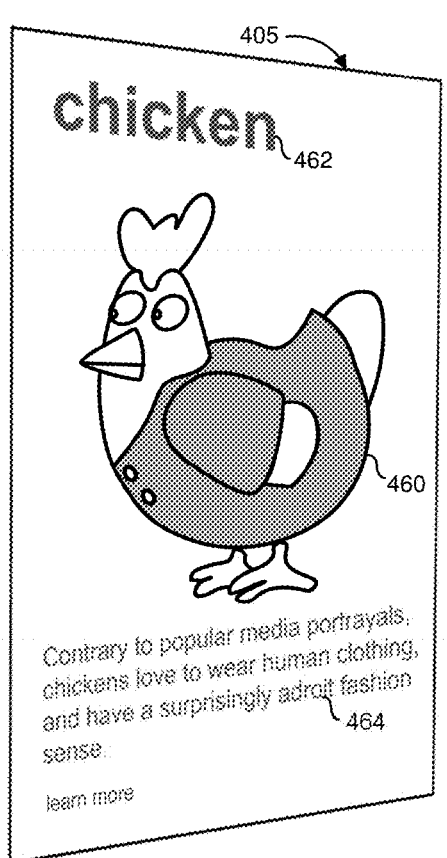

It should be noted that, in some embodiments, the display of the stereoscopic object transformations illustrated in FIGS. 4C-4K is performed in response to receiving an input, e.g., the 3D content protruding from the front side of the virtual paper 405 in response to the user turning (FIGS. 4C-4E), twisting (FIGS. 4F and 4G), or rotating (FIGS. 4H-4K) the virtual paper 405. In some embodiments, the stereoscopic objects can transform without user inputs directed to the virtual paper 405. FIGS. 4L and 4M illustrate transforming a stereoscopic virtual object 460 displayed within the perimeter of the virtual paper 405 without user inputs in accordance with some embodiments.

In FIGS. 4L and 4M, in addition to the stereoscopic virtual object 460, e.g., a 3D chicken 460 displayed in a web page, conforming virtual objects, such as the 2D text "chicken" 462 and the 2D text description 464, are also displayed within the perimeter of the virtual paper 405. In FIGS. 4L and 4M, without user inputs directed to the virtual paper 405, there is no transformation of the virtual paper 405 and/or the conforming virtual objects 462 and 464. While the virtual paper 405 remains stationary, the 3D chicken 460 animates, e.g., the head position of the 3D chicken 460 in FIG. 4L differs from the head position of the 3D chicken 460 in FIG. 4M. In other worlds, the display of the 3D chicken 460 is transformed based on its own set of world coordinates (e.g., the second set of world coordinates ($X_2$, $Y_2$, $Z_2$) described with reference to FIG. 4A), which is different from the first set of world coordinates that the virtual paper 405 and the conforming virtual objects 462 and 464 are based on.

Figure 4N:
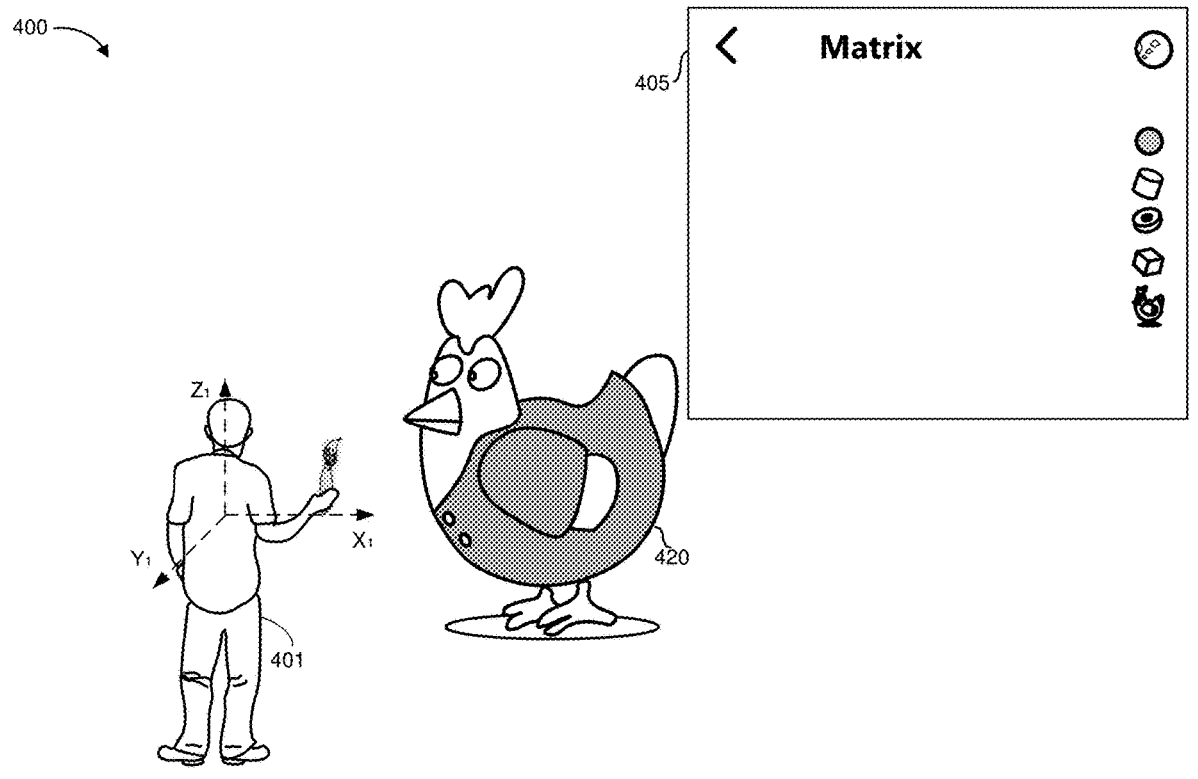
Figure 4O:
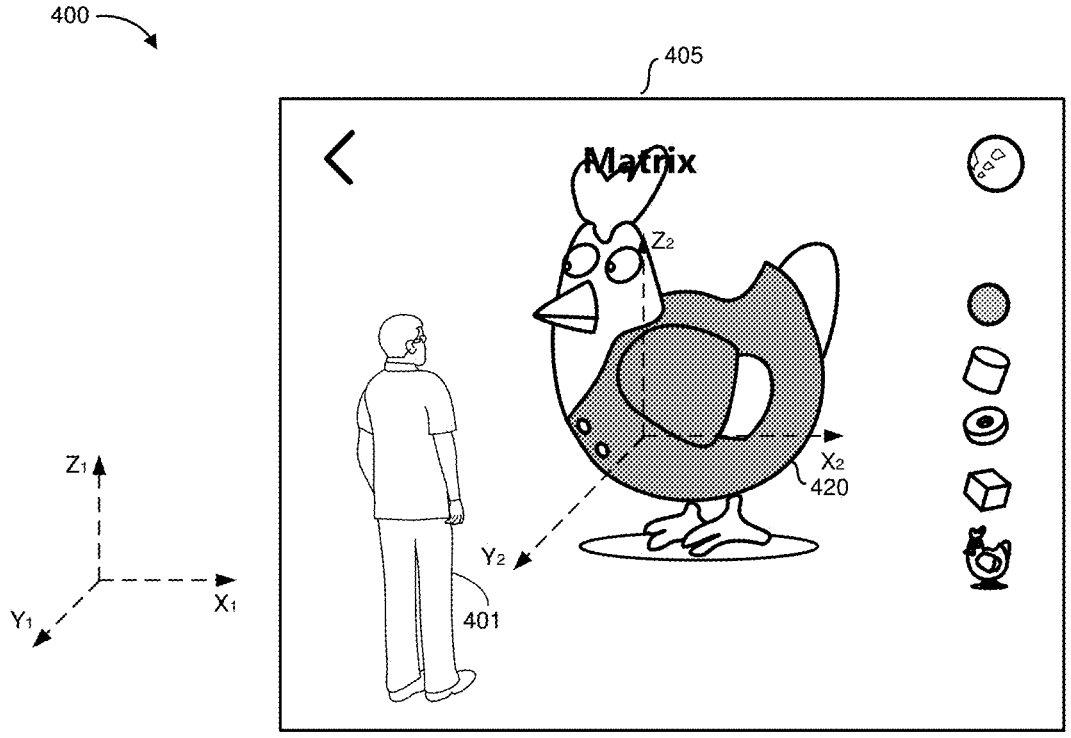

Turning to FIGS. 4N and 4O, FIGS. 4N and 4O illustrate the virtual paper 405 as a portal in the native user CGR environment 400 in accordance with some embodiments. As explained above, in FIG. 4A, the stereoscopic object 420 is displayed in accordance with the second set of world coordinates $(X_2, Y_2, Z_2)$ within the perimeter of the first side of the virtual paper 405. Further as explained above with reference to FIG. 4A, the virtual paper 405 is displayed in accordance with the first set of world coordinates $(X_1, Y_1, Z_1)$ that characterizes the native user CGR environment 400. In some embodiments, the virtual paper 405 is a portal.

For example, in FIG. 4N, the 3D chicken 420 can be moved out of the perimeter of the virtual paper 405 and placed into the native user CGR environment 400. Once placed in the native user CGR environment, the 3D chicken 420 is displayed in accordance with the first set of world coordinates $(X_1, Y_1, Z_1)$. Further, upon entering the native user CGR environment, the user 401 or avatar representing the user 401 in the native user CGR environment can interact with the 3D chicken 420, e.g., paint the crest and/or the beak, etc.

In another example, in FIG. 4O, the user 401 or avatar representing the user 401 can move into the perimeter of the bounded surface 405, e.g., through a user input such as a command of entering the portal represented by the virtual paper 405 or a user pose change indicating the user 401 entering the perimeter of the front side of the virtual paper 405. Once receiving such user input indicating a viewing coordinate change from the first set of world coordinates $(X_1, Y_1, Z_1)$ to the second set of world coordinates $(X_2, Y_2, Z_2)$, in some embodiments, the stereoscopic virtual object in the virtual paper 405 is adjusted. For example, the size of the 3D chicken 420 or the distance of the 3D chicken 420 from the user 401 or avatar representing the user 401 can be adjusted based on the second set of world coordinates $(X_2, Y_2, Z_2)$ to accommodate the viewing of the 3D chicken 420.

FIGS. 5A-5M illustrate interactions with virtual content in a virtual paper 505 in accordance with some embodiments. In some embodiments, the virtual paper 505 is a bounded region that can be flat or volumetric (e.g., a region with a flat or curved surface) marked by edges or bounds around a perimeter of the region. As such, the virtual paper 505 is sometimes also referred to hereinafter as the bounded region 505. In some embodiments, the bounded region 505 is displayed based on a first set of world coordinates, e.g., a set of world coordinates $(X_1, Y_1, Z_1)$ characterizing a native user CGR environment. In some embodiments, the bounded region 505 includes a conforming virtual object (e.g., 2D text "Dinosaur Cutters" 522) within the perimeter of the first side (e.g., the front side) of the bounded region 505. In some embodiments, the virtual content (also referred to hereinafter as the "content") within the bounded region 505 also includes one or more stereoscopic virtual objects. For example, in FIG. 5A, the content with the bounded region 505 includes a first stereoscopic virtual object 512-1 (e.g., a big 3D dinosaur cutter 512-1) and a second stereoscopic virtual object 512-2 (e.g., a small 3D dinosaur cutter 512-2). In some embodiments, the conforming virtual object 522 is displayed at a relative position to the one or more stereoscopic virtual objects 512, e.g., the 2D text "Dinosaur Cutters" 522 is above the 3D dinosaur cutters 512 at a distance measured in accordance with the first set of world coordinates $(X_1, Y_1, Z_1)$. As will be described below, when the confirming virtual object (the 2D text "Dinosaur Cutters" 522) is moved in response to a user input, the relative position between the conforming virtual object (e.g., the 2D text "Dinosaur Cutters" 522) and the stereoscopic virtual objects 512 is maintained during the move.

In some embodiments, as explained above, the stereoscopic virtual objects 512 can be displayed in accordance with different sets of world coordinates, e.g., different from each other and/or different from the set of world coordinates characterizing the native user CGR environment. As such, the display of the stereoscopic virtual objects 512 can transform based on respective sets of world coordinates. In FIG. 5A, the big 3D dinosaur cutter 512-1 is displayed in accordance with a second set of world coordinates $(X_2, Y_2, Z_2)$, and the small 3D dinosaur cutter 512-2 is displayed in accordance with a third set of world coordinates $(X_3, Y_3, Z_3)$. Accordingly, in some embodiments, the big 3D dinosaur cutter 512-1 and the small 3D dinosaur cutter 512-2 are animated in different directions, dimensions, etc. in accordance with different sets of world coordinates.

As indicated by the dotted arrow in FIG. 5A, an input directed to the content within the bounded region 505 is received, wherein the input is in a direction in accordance with the first set of world coordinates $(X_1, Y_1, Z_1)$, e.g., an upward scrolling of the content along $Z_1$ axis within the bounded region 505 in the native user CGR environment. In response to receiving the upward scrolling input, the content within the perimeter of the bounded region 505 is moved upward based on the first set of world coordinates $(X_1, Y_1, Z_1)$. For example, in FIG. 5B, which shows the result of the upward scrolling, the 2D text "Dinosaur Cutter" 522 moves upward and disappears from the bounded region 505, and the stereoscopic virtual objects 512 are also moved upward closer to the top edge of the bounded region 505 in accordance with the first set of world coordinates $(X_1, Y_1, Z_1)$.

In addition to moving the content upward, the stereoscopic virtual objects 512 are animated according to respective sets of world coordinates. For example, FIG. 5A illustrates when the small 3D dinosaur cutter 512-2 is within a threshold distance from the perimeter of the bounded region 505, the small 3D dinosaur cutter 512-2 appears to be flattened into, and/or retracted to the opposite side of, the front surface of the bounded region 505. Further, the flattened small 3D dinosaur cutter 512-2 is occluded by the bottom edge of the bounded region 505. In another example, FIG. 5B illustrates that in response to the upward scrolling, as the big 3D dinosaur cutter 512-1 moves closer to the top edge of the bounded region 505, the big 3D dinosaur cutter 512-1 rotates along the $Y_2$ axis, so that it appears to be flattened into the bounded region in preparation for being occluded by the top edge of the bounded region 505. Further as shown in FIG. 5B, once the small 3D dinosaur cutter 512-2 moves upward and beyond a threshold distance from the perimeter of the front side of the bounded region 505, e.g., the small 3D dinosaur cutter 512-2 is moved upward and displayed within the bounded region 505 in its entirety, the small 3D dinosaur cutter 512-2 rotates along the $Y_3$ axis to provide a different perspective of the small 3D dinosaur cutter 512-2. As a result, a portion of the small 3D dinosaur cutter 512-2 protrudes from the front side of the bounded region 505.

Figures 5C, 5D:
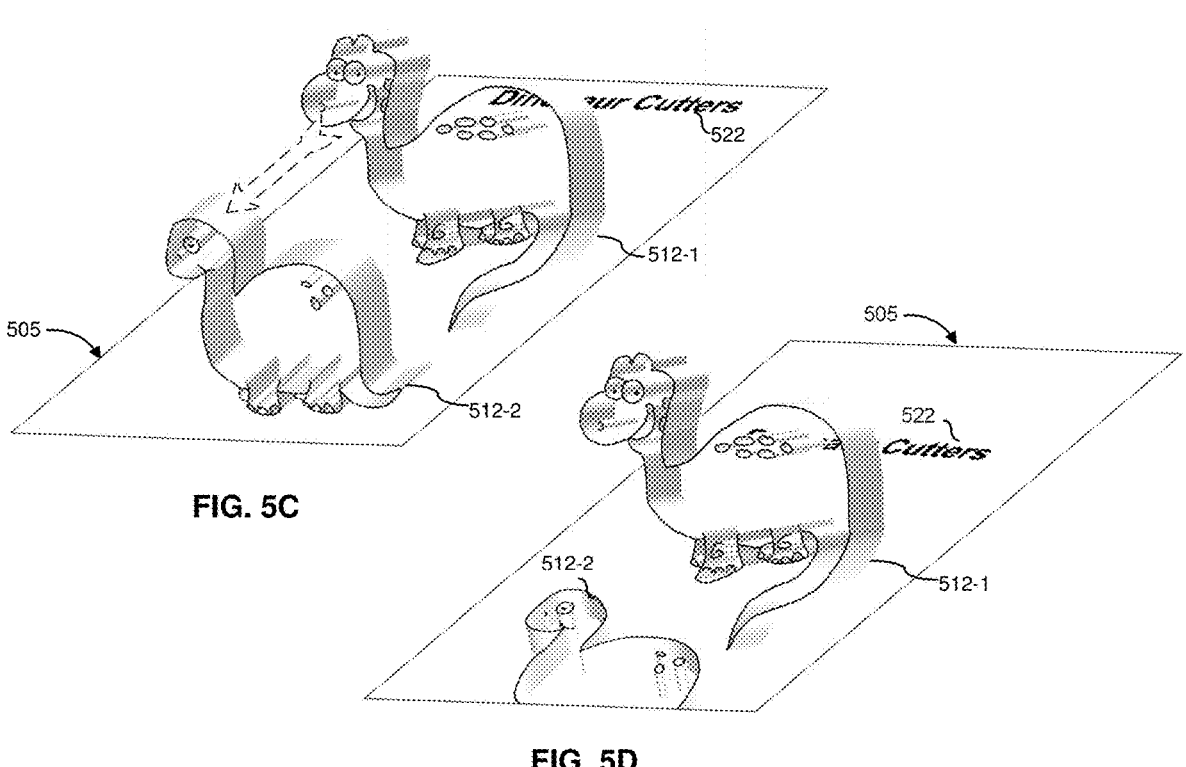

FIGS. 5C and 5D illustrate interacting with the content displayed within the perimeter of the front side of the bounded region 505 when the bounded region 505 is laid flat in accordance with some embodiments. In some embodiments, when the display of the bounded region 505 transforms in response to receiving a user input, e.g., laid down or rotate the bounded region 505 around the $X_1$ axis of the first set of world coordinates $(X_1, Y_1, Z_1)$ (not shown), the conforming virtual object 522 transforms accordingly in order to remain aligned with the contour transformation of the bounded region 505. For example, in FIG. 5C, once the bounded region 505 is laid flat, the 2D text "Dinosaur Cutters" 522 is also laid flat in order to conform to the front surface of the bounded region 505. In FIG. 5C, in response to the scrolling input as indicated by the dotted arrow, the 2D text "Dinosaur Cutters" 522 moves in the direction of the scrolling input and maintains the relative position to the stereoscopic virtual objects 512, as shown in FIG. 5D.

Different from the transformation of the conforming virtual object (e.g., the 2D text "Dinosaur Cutters" 522), the stereoscopic virtual objects 512 are animated according to different sets of world coordinates in response to the input of laying down the bounded region 505. In FIG. 5C, the 3D dinosaur cutters 512 protrude from the front side of the bounded region 505, e.g., standing up or rotating based on the respective set world coordinates. As a result, instead of being displayed as one above or on top of another as shown in FIGS. 5A and 5B, the 3D dinosaur cutters 512 are displayed in rows or as if one is in front of another in FIGS. 5C and 5D. Accordingly, in response to a scrolling input as indicated by the dotted arrow, the 3D dinosaur cutters 512 are scrolled row-by-row from front row to back row.

FIG. 5D also illustrates that in some embodiments, when the small 3D dinosaur cutter 512-2 is close to an edge of the bounded region 505, e.g., within a threshold distance from the perimeter of the bounded region 505, the small 3D dinosaur cutter 512-2 tilts, collapses, or rotates around the $X_3$ axis based on the third set of world coordinates ($X_3$, $Y_3$, $Z_3$) (not shown). As such, the small 3D dinosaur cutter 512-2 retracts toward the opposite side of the surface of the bounded region 505 and a portion of the small 3D dinosaur cutter 512-2 is occluded by the edge of the bounded region 505.

FIGS. 5E-5H illustrate displaying a second side (e.g., a backside) of the bounded region 505 in accordance with some embodiments. Similar to the virtual paper 405 described above with reference to FIGS. 4A-4O, in some embodiments, the bounded region 505 has a backside that includes a rasterized conforming representation of the stereoscopic virtual object from the front side. For example, in FIG. 5E, content from the front side of the bounded region includes a stereoscopic object 520, e.g., a 3D chicken 520. In FIG. 5F, the corresponding backside of the bounded region 505 includes a blurred image of a chicken 520-B that corresponds to a rasterized conforming representation of the 3D chicken 520 displayed on the front side.

In FIG. 5G, as indicated by the dotted arrow, an upward scrolling input is directed to the content within the perimeter of the first side of the bounded region 505. In response to receiving the upward scrolling input, as shown in FIG. 5F, the 3D chicken 520 moves upward and a portion of another stereoscopic virtual object, e.g., a 3D dog 524 in a web page appears within the bounded region 505. Though not shown in FIG. 5G, as the upward scrolling continues, the 3D dog 524 would be displayed in the center of the bounded region 505. In response to the upward scrolling input, as shown in FIG. 5H, the corresponding backside of the bounded region 505 includes a blurred image of a dog 524-B that corresponds to a rasterized conforming representation of the 3D dog 524 displayed on the front side.

In some embodiments, content on the backside of the bounded region 505 (e.g., the blurred image of the chicken 520-B (FIG. 5F) or the dog 524-B (FIG. 5H) or blurred images of 2D text) can also be moved in response to receiving an input, e.g., scrolling the blurred images up and/or down. In response to receiving the input directed to the content on the backside, the corresponding stereoscopic virtual object(s) on the front side of the bounded region 505 can be moved accordingly. Additionally, as explained above, while moving the corresponding stereoscopic virtual object (s), the corresponding stereoscopic virtual object(s) can also animate in accordance with the respective set world coordinates.

Figure 5I:
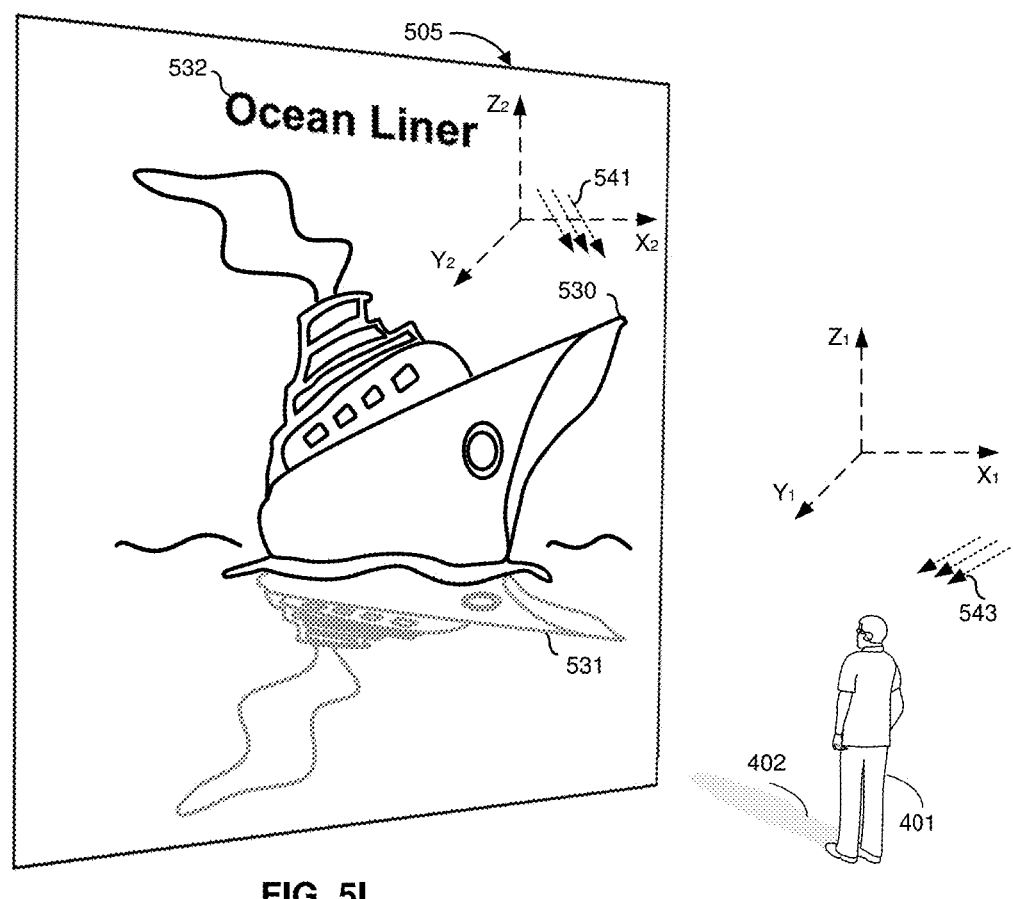

FIG. 5I illustrates displaying a large stereoscopic virtual object in the bounded region 505 in accordance with some embodiments. In some embodiments, when a stereoscopic virtual object is too large to fit inside the native user CGR environment, the stereoscopic virtual object is placed within the bounded region 505. For example, when an ocean liner that is too big to fit inside the native user CGR environment, the ocean liner can be placed inside the bounded region 505. In FIG. 5I, an ocean liner 530 is displayed within the bounded region 505 based on the world coordinates ($X_2$, $Y_2$, $Z_2$) and scaled proportionate to the size of the bounded region 505. After the ocean liner 530 is placed within the bounded region 505, the user 401 can peer through the bounded region 505 in order to view the ocean liner 530 at full-scale and from an appropriate distance. Similar to other stereoscopic virtual objects described above, the ocean liner 530 displayed inside the bounded region 505 can animate according to its own set world coordinates ($X_2$, $Y_2$, $Z_2$). For example, in FIG. 5I, the ocean liner 530 may float or sail so that the bow (or the front end) of the ocean liner 530 sticks out from the surface of the front side of the bounded region 505 and becomes closer to the user 401 as it is presented in a stereoscopic manner. As such, the user 401 can examine the bow of the ocean liner 530 in close distance.

In some embodiments, properties of the ocean liner 530, e.g., distance, direction, orientation, scale, moving speed, etc., can be further adjusted in response to an input. For example, in response to an input directed to the bounded region 505, the ocean liner 530 can be turned around within the bounded region 505. As such, the stern (or the rear) of the ocean liner 530 would be closer to the user 401, and the user can examine the stem of the ocean liner 530 in close distance. Once the user 401 finishes examining the ocean liner 530, an input from the user 401 (e.g., a gesture signaling a push) corresponding to the portion of the ocean liner 530 protruding from the surface of the bounded region 505 can send the ocean liner 530 sailing into the ocean.

In addition, as explained above with reference to FIG. 4A, in some embodiments, different world lightings illuminate different virtual objects and/or different parts of the environment. For instance, the ocean liner 530, which is a stereoscopic virtual object displayed within and inside the bounded region 505 in accordance with the world coordinates ($X_2$, $Y_2$, $Z_2$), sun light 541 above the ocean liner 530 applies shading to the ocean liner 530. As a result, a shadow and/or reflection of the ocean liner 530 may appear on the water beneath the ocean liner 530. In FIG. 5I, from the user's 401 perspective, the world lighting (e.g., the sun light 541) that is above and behind the ocean liner 530 causes the shadow and/or reflection towards the user 401. In contrast, a shadow 402 of the user 401 indicates a different light source 543 in the native user CGR environment, e.g., the light source 543 that casts light from the back of the user 401 in accordance with the world coordinates ($X_1$, $Y_1$, $Z_1$) for the native user CGR environment. As a result, from the user's 401 perspective, the shadow 402 is in front of and away from the user 401, e.g., in the opposite direction of the shadow and/or a reflection 531 of the ocean liner 530. Further, a conforming virtual object, e.g., the text "Ocean Liner" 532 that is displayed within a threshold distance from the surface of the bounded region 505 (e.g., on the surface of the bounded region 505) and close to the native user CGR environment, may be illuminated by a different world lighting from the ocean liner 530. As a result, there is no shadow of the text "Ocean Liner" 532 towards the user 401.

It should be noted that FIG. 5I illustrates one example of world lighting. In some other embodiments, stereoscopic and conforming virtual objects displayed within the bounded region 505 share the same world lighting. Further, in some embodiments, the same light source illuminates both within the bounded region 505 and outside bounded region 505. In such embodiments, the same light source, e.g., a point, spot, directional, area, volume, ambient light, etc., can provide lighting according to multiple world coordinates. For instance, the user 401, the text "Ocean Liner" 532, and the ocean liner 530 can share one world lighting and the effects of such lighting may differ in accordance with various world coordinates.

Figure 5J:
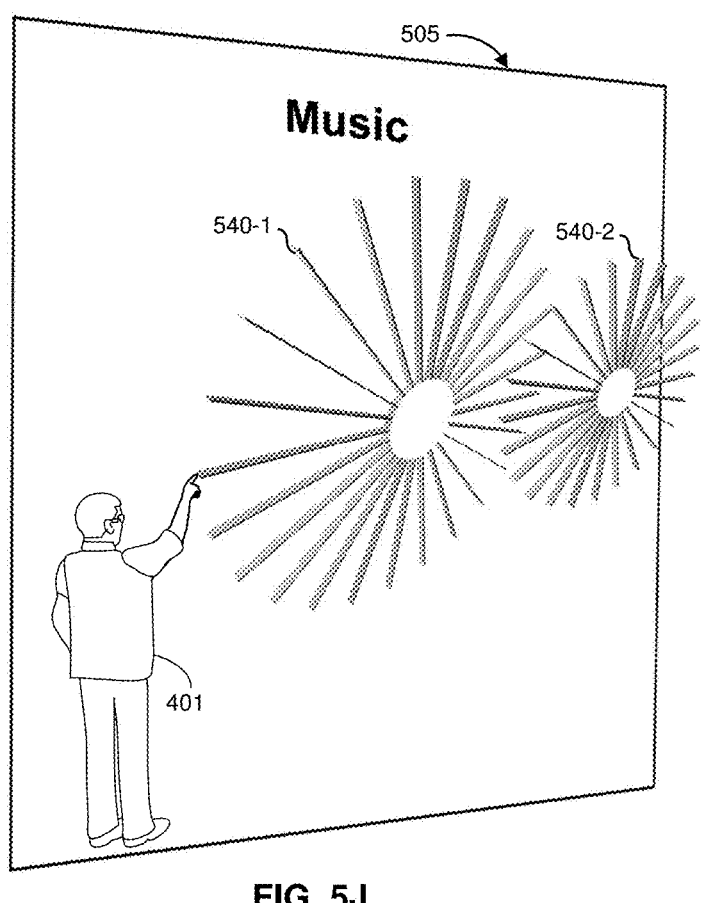

FIG. 5J illustrates displaying and interacting with stereoscopic virtual objects that visualize audio signals in accordance with some embodiments. Audio signals are difficult to visualize in conventional 3D environment. For example, audio signals representing a piece of music may not adhere to familiar physical dimensions or lighting metaphors. Thus, previously existing audio systems or electromagnetic wave visualization systems and methods are often limited to 2D representation. Using the bounded region 505, audio signals can be visualized by stereoscopic virtual objects in accordance with some embodiments.

For example, in FIG. 5J, stereoscopic virtual objects 540-1 and 540-2 are displayed within the bounded region 505. The stereoscopic virtual objects correspond to visual representations of audio signals in some embodiments. For example, the bounded region 505 includes the stereoscopic virtual objects 540 in order to visualize music. Similar to other stereoscopic virtual objects described above, the stereoscopic virtual objects 540 displayed in the bounded region 505 can be animated according to respective sets of world coordinates. As the music plays, the stereoscopic virtual objects 540 are animated in order to show attributes of the music, e.g., the stereoscopic objects 540 may grow larger or change to a bright color corresponding to loud brass instruments playing or shrink or change to a dark color corresponding to quiet and soft string instruments playing. Further, as attributes of the music change, the stereoscopic virtual objects 540 move around, e.g., protruding from the front surface of the bounded region 505. The music visualization through the stereoscopic virtual objects 540 thus provides the user 401 a multidimensional experience.

Further, in some embodiments, properties of the stereoscopic virtual objects 540, e.g., size, color, animation speed, etc., are adjusted in response to an input. For example, the user 401 can touch the stereoscopic virtual object 540-1, move it around, send it flying, or pull it out of the bounded region 505. In some embodiments, the stereoscopic virtual objects 540 are associated with the audio signals that they represent. As such, changes to the properties of the stereoscopic virtual objects 540 also change the corresponding audio signals. Accordingly, the interaction with the stereoscopic virtual objects 540 can alter the corresponding music that the stereoscopic virtual objects 540 represent.

Figure 5K:
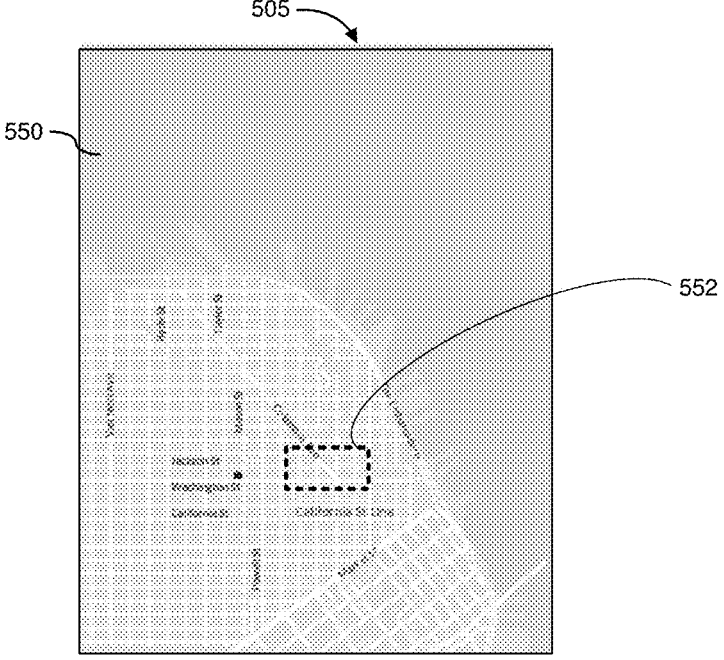
Figure 5L:
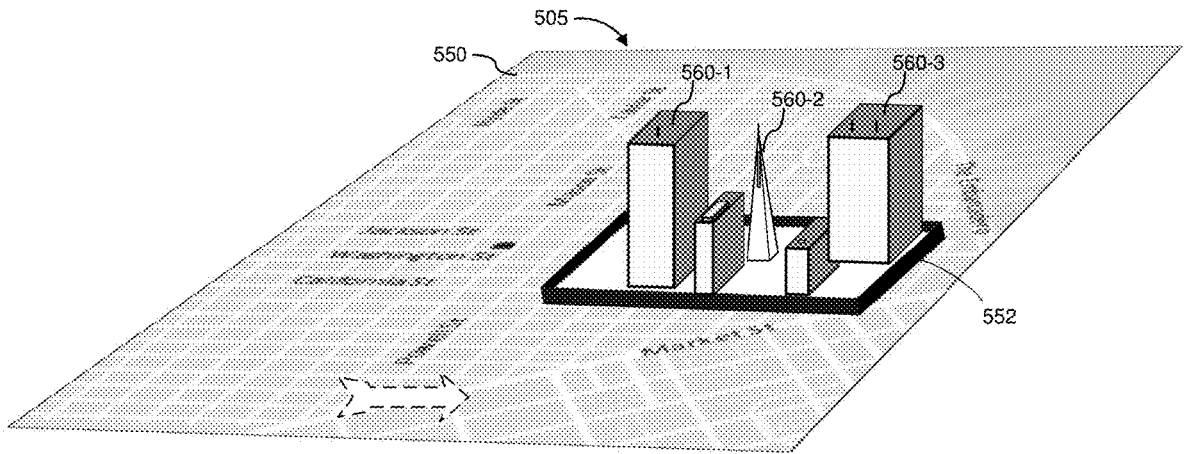
Figure 5M:
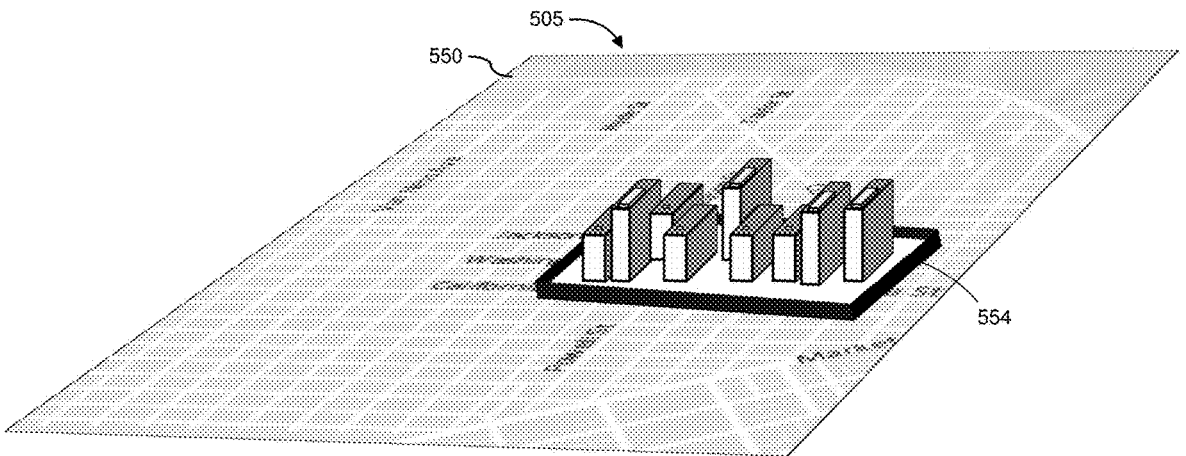

FIGS. 5K-5M illustrate interacting with a map 550 displayed within the perimeter of the bounded region 505 in accordance with some embodiments. In previously existing systems, a map typically has either a 2D representation or a 3D representation of an area. In FIG. 5K, the map 550 is displayed within the bounded region 505. Similar to the maps in previously existing systems, the map 550 is interactive, e.g., panning and/or zooming the map 550 etc.

Different from the maps in previously existing systems, however, the map 550 can include both stereoscopic virtual objects and non-stereoscopic virtual objects (e.g., 2D text or 2D map image).

For example, as shown in FIG. 5K, a subregion 552 within the perimeter of the bounded region 505 is designated. In response to designating the subregion 552, as shown in FIG. 5L, stereoscopic virtual objects 560 are displayed within a perimeter of the subregion 552. In FIG. 5L, stereoscopic virtual objects 560 include, for instance, 3D tall buildings 560-1 and 560-3 and a 3D pyramid 560-2. These stereoscopic virtual objects 560 represent a 3D view of a portion of the map 550 within the perimeter of the subregion 552, e.g., an area close to Market St. as labeled on map 550. Though not shown in FIG. 5L, in some embodiments, the stereoscopic virtual objects 560 can also include 3D street signs, 3D traffic lights, and/or live traffic (e.g., moving cars and/or buses), etc. Outside the perimeter of the subregion 552, in some embodiments, conforming virtual objects are displayed, e.g., 2D map displaying streets/roads and road labels. As such, the stereoscopic virtual objects 560 and non-stereoscopic virtual objects (e.g., the rest of the map within the bounded region 505) co-exist within the perimeter of the bounded region 505.

In some embodiments, the location of the subregion 552 within the bounded region 505 is fixed in accordance with the set of world coordinates characterizing the native user CGR environment. In other words, as the map 550 moves, the location of the subregion 552 is unchanged within the bounded region 505, as if the subregion 552 opens a window that pins to a location within the bounded region 505. As such, the distances of the subregion 552 to edges of the bounded region 505 are fixed. In such embodiments, as the map 550 moves, map content slides into and out of the window. In some embodiments, the content that slides into the window is converted into corresponding stereoscopic virtual content, and the content that slides out of the perimeter of the subregion 552 is converted into corresponding conforming virtual content.

For example, in FIG. 5L, a panning input directed to the map 550 within the bounded region 505 is detected, as indicated by the dotted arrow. In response to receiving the panning input towards to the right edge of the bounded region 505, the map 550 is moved to the right. As a result, at least some of the stereoscopic virtual object 560 are moved out of the perimeter of the subregion 552. Once moved out of the perimeter of the subregion 552, in some embodiments, at least some of the stereoscopic virtual objects 560 are converted into one or more conforming virtual objects, e.g., 2D map displaying streets/roads and road labels for the area close to Market St. In some embodiments, in response to receiving the panning input towards the right edge of the bounded region 505, another location/area on the map 550 moves into the location associated with the subregion 552, e.g., the area proximate to Jackson St. Accordingly, the 2D streets/roads and/or road labels proximate to Jackson St. as shown in FIG. 5L are converted to corresponding 3D objects and displayed within the perimeter of the subregion 554, e.g., as shown in FIG. 5M, a cluster of small 3D buildings proximate to Jackson St.

Though not shown in the figures, in some embodiments, the location of the subregion 552 based on the set of world coordinates characterizing the native user CGR environment is associated with (or attached to) the content on the map 550. For example, in FIG. 5L, the location of the subregion 552 can be associated with the area close to the Market St. In such embodiments, while the content displayed within the bounded region 505 is being moved (e.g., panned or dragged), the location of the subregion 552 moves with the associated content on the map 550. As a result, the stereoscopic virtual objects 560 displayed within the perimeter of the subregion 522 move with the rest of the content on the map 550. In other words, when panning the map 550, the stereoscopic virtual objects 560 within the designated subregion move along with the rest of the map 550.

FIGS. 6A and 6B represent a flowchart of a method 600 for displaying stereoscopic virtual content within a perimeter of a bounded surface in accordance with some embodiments. In some embodiments, the method 600 is performed by a device with one or more processors, non-transitory memory, and one or more displays. In some embodiments, the method 600 is performed by processing logic, including hardware, firmware, software, or a combination thereof. In some embodiments, the method 600 is performed by a processor and/or a controller (e.g., the controller 102 in FIGS. 1A, 1B, and 2) executing instructions (e.g., code) stored in a non-transitory computer-readable medium (e.g., a memory). Briefly, in some circumstances, the method 600 includes: displaying a bounded surface within a native user computer-generated reality (CGR) environment, where the bounded surface is displayed based on a first set of world coordinates characterizing the native user CGR environment; and displaying a first stereoscopic virtual object within a perimeter of a first side of the bounded surface, where the first stereoscopic virtual object is displayed in accordance with a second set of world coordinates that is different from the first set of world coordinates characterizing the native user CGR environment.

The method 600 begins, in block 602, with the device, displaying a bounded surface within a native user computer-generated reality (CGR) environment, wherein the bounded surface is displayed based on a first set of world coordinates characterizing the native user CGR environment. For example, FIG. 4A illustrates displaying the bounded surface 405 based on the first set of world coordinates $(X_1, Y_1, Z_1)$. FIG. 4A further illustrates that the first set of world coordinates $(X_1, Y_1, Z_1)$ characterizes the native user CGR environment 400, in which the user or the avatar representing the user 401 is located.

The method 600 continues, in block 604, with the device displaying a first stereoscopic virtual object within a perimeter of a first side of the bounded surface, wherein the first stereoscopic virtual object is displayed in accordance with a second set of world coordinates that is different from the first set of world coordinates characterizing the native user CGR environment. For example, in FIG. 4A, the stereoscopic virtual object 420, which is a 3D chicken, is displayed within the perimeter of the front side of the bounded surface 405. Further as shown in FIG. 4A, while the bounded surface 405 is displayed based on the first set of world coordinates $(X_1, Y_1, Z_1)$, the 3D chicken 420 is displayed in accordance with the second set of world coordinates $(X_2, Y_2, Z_2)$ that is different from the first set of world coordinates $(X_1, Y_1, Z_1)$. As such, from the perspective of the user 401, the 3D chicken 420 appears to be displayed inside or behind the front side of the bounded surface 405.

In some embodiments, as represented by block 610, the method 600 further includes displaying a conforming virtual object within the perimeter of the bounded surface, wherein the conforming virtual object conforms to a contour of the bounded surface characterized by the first set of world coordinates. In such embodiments, as represented by block 612, the method 600 further includes concurrently transforming display of the conforming virtual object in response to transforming the contour of the bounded surface.

For example, in FIG. 4A, the 2D text "Matrix" 410 is a conforming virtual object that is displayed within the perimeter of the first side of the bounded surface 405 in accordance with the first set of world coordinates $(X_1, Y_1, Z_1)$. In FIG. 4A, the 2D text "Matrix" 410 is parallel to the top edge of the bounded surface 405 and conforms to the flat front side of the bounded surface 405, as if it is floating on the flat front side of the bounded surface 405. In FIGS. 4H-4K, the contour of the bounded surface 405 changes in response to the rotating input, e.g., the outline of bounded surface 405 changes from a rectangle shape to a trapezoid shape. As a result, the shape of the 2D text "Matrix" 410 changes concurrently in order to remain aligned with the contour transformation of the bounded surface 405, e.g., the perspective and shape of the 2D text "Matrix" 410 change in order to conform to the trapezoid-shaped bounded surface 405.

In another example, in FIG. 5G, the 2D text "dog" is a conforming virtual object that is displayed within the perimeter of the front side of the bounded surface 505 and that conforms to the contour of the flat bounded surface 505. In FIG. 4F, the contour of the bounded surface 405 changes in response to the rotating input, e.g., the bounded surface 405 is twisted and the outlines of the bounded surface 405 are curved. In response to the transformation of the bounded surface 405, as shown in FIG. 4F, the 2D text "dog" is displayed in a curved line and appears to be wrinkled to conform to the twisted bounded surface 405.

Referring back to FIG. 6A, in some embodiments, as represented by block 620, the method 600 further includes displaying a second side of the bounded surface, wherein the backside of the bounded surface includes a rasterized conforming representation of the first stereoscopic virtual object. In such embodiments, as represented by block 622, displaying the second side of the bounded surface includes displaying on the second side of the bounded surface a blurred representation of the rasterized conforming representation of the first stereoscopic virtual object in accordance with some embodiments.

For example, FIGS. 4B, 4E, and 4G illustrate displaying the backside of the bounded surface 405. As shown in FIG. 4B, the backside of the bounded surface 405 includes the conforming representation 420-B of the 3D chicken 420 from the front side of the bounded surface 405. As a result, the bounded surface 405 appears to be translucent or semi-transparent, such that a blurred chicken image 420-B is displayed on the backside of the bounded surface 405 within the perimeter of the backside of the bounded surface 405. Likewise, in FIGS. 4E and 4G, the backside of the bounded surface 405 includes a conforming (e.g., 2D) representation of the respective stereoscopic virtual object from the front side of the bounded surface 405. Because the conforming representation of the respective stereoscopic virtual object conforms to the bounded surface 405 when the bounded surface 405 transforms, e.g., in response to an input to turn the bounded surface 405 around, as shown in FIGS. 4E and 4G, the rasterized conforming representation on the backside concurrently transforms to remain aligned with curved the bounded surface 405.

In some embodiments, as represented by block 630, the method 600 further includes transforming display of the bounded surface in order to change a contour of the bounded surface in response to an input directed to the bounded surface. In such embodiments, as represented by block 632, the method 600 further includes receiving the input from a user, including detecting a body pose change of the user. Further, in such embodiments, as represented by block 634, transforming the display of the bounded surface includes transforming the display of the first stereoscopic virtual object based on the first set of world coordinates and the second set of world coordinates.

For example, as explained above with reference to FIGS. 4C-4K, the input can be the user turning the bounded surface 405 to the backside. As the bounded surface 405 transforms in response to the input, the head of the 3D chicken is moved in accordance with the second set of world coordinates ($X_2$, $Y_2$, $Z_2$) while being carried with the movements of the bounded surface 405. In another example, though not shown in the figures, the input can be the user walking to the backside of the bounded surface 405 in the CGR environment 400 to examine the backside of the portal. In yet another example, the input can be the user moving a portable multifunction device to see the bounded surface 405 from a different angle in order to obtain a view of the side of the bounded surface 405 as shown in FIG. 4J. Thus, a body pose change of the user detected by the device can be the input to trigger a transformation of the bounded surface 405. For example, the body pose change can include: the user clicking a button to turn the bounded surface 405 around; the user twisting or flicking the bounded surface 405, the user folding the bounded surface 405; the user pushing down the bounded surface 405; the user selecting the 3D toolbox objects 440; and/or the like. One of ordinary skill in the art will appreciate that the input is not limited to the body pose changes described above. Other forms of input, such as a voice input can also be used to trigger the transformation of the bounded surface. Further, in some embodiments, the transformation of the bounded surface is carried out without a user input.

Turning to FIG. 6B, in some embodiments, as represented by block 640, the method 600 further includes transforming display of the first stereoscopic virtual object based on the second set of world coordinates. In such embodiments, as represented by block 642, transforming the display of the first stereoscopic virtual object based on the second set of world coordinates includes displaying at least a portion of the first stereoscopic virtual object as protruding from the first side of the bounded surface in accordance with some embodiments. In other words, in some embodiments, the display of stereoscopic virtual object transforms not in response to a user input. In such embodiments, the transformation of the stereoscopic virtual object can be disproportionate from the transformation of the bounded surface and the transformation of the conforming virtual object.

For example, in FIGS. 4L and 4M, the head of the 3D chicken 460 moves even when the bounded surface 405 is not moving. In another example, as shown in FIGS. 4H-4K, the 3D chicken 420 rotates around the axis 452 based on the second set of world coordinates ($X_2$, $Y_2$, $Z_2$), while the bounded surface 405 rotates around the vertical axis 450 based on the first set of world coordinates ($X_1$, $Y_1$, $Z_1$). In another example, as shown in FIG. 5C, when the bounded surface 505 is laid flat, the 3D dinosaur cutters 512 stand up and protrude from the front side of the bounded surface 505.

Still referring to FIG. 6B, in some embodiments, as represented by block 650, the method 600 further includes that displaying a virtual object within the perimeter of the bounded surface includes occluding at least part of the first stereoscopic virtual object. In such embodiments, as represented by block 652, the method 600 further includes displaying the first side of the bounded surface askew from a perpendicular sightline associated with a user pose, and ceasing to display the virtual object as occluding the at least part of the first stereoscopic virtual object. For example, in FIG. 4A, the front view of the bounded surface 405 shows a near perpendicular sightline associated with the user 401 standing nearly in front of the bounded surface 405. From the near perpendicular sightline perspective, in FIG. 4A, the 3D chicken 420 within the bounded surface 405 is behind the 2D text "Matrix" 410 floating on the front side of the bounded surface 405. Thus, the 2D text "Matrix" 410 occludes the crest of the 3D chicken 420. In comparison, in the angled view as shown in FIG. 4J, when the bounded surface 405 is turned to certain angle and the front side of the bounded surface 405 is askew from the perpendicular sightline perspective, the 2D text "Matrix" 410 no longer occludes the crest of 3D chicken 420.

In some embodiments, as represented by block 660, the method 600 further includes moving the first stereoscopic virtual object out of the perimeter of the bounded surface and into the native user CGR environment, and displaying the first stereoscopic virtual object in accordance with the first set of world coordinates in response to the first stereoscopic virtual object entering the native user CGR environment. For example, in FIG. 4N, the 3D chicken 420 can be pulled outside the perimeter of the front side of the bounded surface 405 and placed in front of the user 401, e.g., as if pulling the 3D chicken 420 out of a portal in preparation for color painting the 3D chicken 420. By pulling the 3D chicken 420 outside the perimeter of the bounded surface 405, the 3D chicken 420 is no longer displayed in accordance with the second set of world coordinates ($X_2$, $Y_2$, $Z_2$). Instead, the 3D chicken 420 is displayed and/or animated in accordance with the first set of world coordinates ($X_1$, $Y_1$, $Z_1$) along with the user 401.

In some embodiments, as represented by block 670, the method 600 further includes receiving a user input indicating a viewing coordinate change from the first set of world coordinates of the native user CGR environment to the second set of world coordinates within the bounded surface. In response to receiving the user input indicating the viewing coordinate change, further as represented by block 670, the method 600 also includes adjusting display of the first stereoscopic virtual object in accordance with the second set of world coordinates. For example, in FIG. 4O, the user 401 can step into the perimeter of the bounded surface 405 or peer through the bounded surface, e.g., as if going through a portal in order to examine the 3D chicken 420. In response to detecting a user input (e.g., the body pose changes) indicating a viewing coordinate change from the first set of world coordinates ($X_1$, $Y_1$, $Z_1$) to the second set of world coordinates ($X_2$, $Y_2$, $Z_2$), the display of the 3D chicken 420 changes, e.g., the 3D chicken 420 being moved in accordance with the second set of world coordinates ($X_2$, $Y_2$, $Z_2$). In another example, though not shown in the figures, after the user pulls a stereoscopic virtual object out of the bounded surface, the user can interact with the stereoscopic virtual object (e.g., changing or adding color, adding a tie, etc.) and then put the stereoscopic virtual object back into the perimeter of the front side of the bounded surface to see the effect of the modification in the bounded surface.

In some embodiments, as represented by block 680, the method 600 further includes displaying a second stereoscopic virtual object within the perimeter of the bounded surface, wherein the second stereoscopic virtual object is displayed in accordance with a third set of world coordinates that is different from the first and second sets of world coordinates. For example, in FIGS. 4H-4K, each of the 3D toolbox objects 440 can rotate according to its own set of world coordinates. The respective set of world coordinates for a respective 3D toolbox object 440 can be different from the second set of world coordinates $(X_2, Y_2, Z_2)$ that the 3D chicken 420 is based on. As a result, the 3D chicken 420 and 3D toolbox objects 440 can animate differently, e.g., rotating around different axes in different world coordinate systems.

Figure 7B:
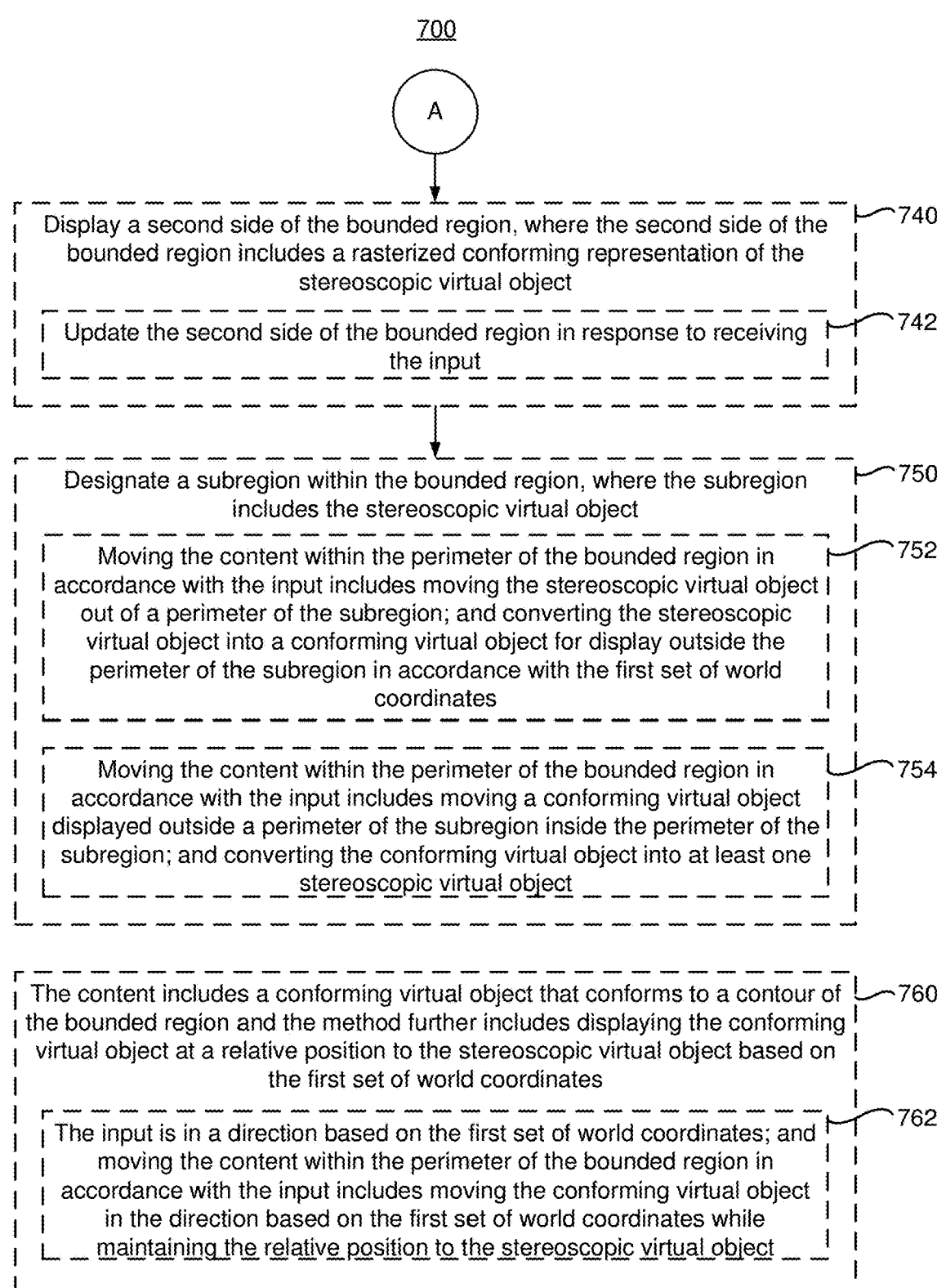

FIGS. 7A and 7B represent a flowchart of a method 700 of displaying stereoscopic virtual content within a perimeter of a bounded surface in accordance with some embodiments. In some embodiments, the method 700 is performed by a device with one or more processors, non-transitory memory, and one or more displays. In some embodiments, the method 700 is performed by processing logic, including hardware, firmware, software, or a combination thereof. In some embodiments, the method 700 is performed by a processor and/or a controller (e.g., the controller 102 in FIGS. 1A, 1B, and 2) executing instructions (e.g., code) stored in a non-transitory computer-readable medium (e.g., a memory). Briefly, in some circumstances, the method 700 includes: displaying a bounded region based on a first set of world coordinates, wherein content within the bounded region includes a stereoscopic virtual object displayed in accordance with a second set of world coordinates; receiving an input directed to the content; and moving the content within a perimeter of a first side of the bounded region in accordance with the input, including moving the stereoscopic virtual object within the perimeter of the first side of the bounded region in accordance with the input; and animating the stereoscopic virtual object in accordance with the second set of world coordinates.

The method 700 begins, in block 710, with the device displaying a bounded region based on a first set of world coordinates, wherein content within the bounded region includes a stereoscopic virtual object displayed in accordance with a second set of world coordinates. For example, in FIG. 5A, the bounded region 505 is displayed based on the first set of world coordinates $(X_1, Y_1, Z_1)$. Further shown in FIG. 5A, the content displayed within the bounded region 505 includes the 3D dinosaur cutters 512, wherein the 3D dinosaur cutters 512 are displayed in accordance with the second set of world coordinates $(X_2, Y_2, Z_2)$.

In some embodiments, as represented by block 712, the method further includes scaling the stereoscopic virtual object to fit within the perimeter of the first side of the bounded region. For example, the ocean liner 530 as shown in FIG. 5I is displayed within the perimeter of the front side of the bounded region 505 at full-scale and in an appropriate distance to facilitate the viewing.

The method 700 continues, in block 720, with the device receiving an input directed to the content. For example, the input can be the user scrolling the content up and/or down as shown by the dotted arrow in FIGS. 5A, 5G, and 5L. In another example, the input can be the user scrolling the stereoscopic virtual objects row-by-row as shown by the dotted arrow in FIG. 5C. In yet another example, in the ocean liner example shown in FIG. 5I, the input can be the user moving the ocean liner 530 inside the bounded region 505 to view the front or side of the ocean liner 530. In still another example, the input can be the user 401 interacting with the stereoscopic virtual object 540-1 as shown in FIG. 5J.

Still referring to FIG. 7A, the method 700 continues, in block 730, with the device moving the content within a perimeter of a first side of the bounded region in accordance with the input. For example, in FIGS. 5A and 5B, in response to the upward scrolling input, the 3D dinosaur cutters 512 are scrolling upwards in accordance with the direction of the upward scrolling input. In another example, in FIGS. 5C and 5D, in response to back to front row-by-row scrolling input, the 3D dinosaur cutters 512 are moved from the back to front.

In some embodiments, moving the content within the perimeter of the first side of the bounded region in accordance with the input includes: (a) moving the stereoscopic virtual object within the perimeter of the first side of the bounded region in accordance with the input, as represented by block 732; and (b) animating the stereoscopic virtual object in accordance with the second set of world coordinates, as represented by block 734. For example, in FIG. 5B, the small 3D dinosaur cutter 512-2 rotates in accordance with the second set of world coordinates $(X_2, Y_2, Z_2)$.

In some embodiments, as represented by block 736, animating the stereoscopic virtual object in accordance with the second set of world coordinates includes: determining a distance of the stereoscopic virtual object from the perimeter of the first side of the bounded region based on the first set of world coordinates; and in accordance with a determination that the distance is within a threshold, retracting the stereoscopic virtual object into the bounded region, and occluding a portion of the stereoscopic virtual object by the perimeter of the first side of the bounded region. For example, the big 3D dinosaur cutter 512-1 in FIG. 5B and the small 3D dinosaur cutter 512-2 in FIG. 5D fold inside the bounded region 505 when being scrolled near the edge of the bounded region 505. Further, by nature of occlusion, once the big 3D dinosaur cutter 512-1 in FIG. 5B and the small 3D dinosaur cutter 512-2 in FIG. 5D retract into the bounded region 505, a portion of the respective stereoscopic virtual object 512 is occluded by the perimeter of the front side of the bounded region 505. For instance, the big 3D dinosaur cutter 512-1 in FIG. 5B is occluded by the top edge of the bounded region 505, and the small 3D dinosaur cutter 512-2 in FIG. 5D is occluded by the bottom edge of the bounded region 505.

In some embodiments, as represented by block 738, animating the stereoscopic virtual object in accordance with the second set of world coordinates includes: determining a distance of the stereoscopic virtual object from the perimeter of the first side of the bounded region based on the first set of world coordinates; and in accordance with a determination that the distance greater than a threshold, displaying at least a portion of the stereoscopic virtual object as protruding from the first side of the bounded region. For example, in FIG. 5B, as content within the bounded region 505 being scrolled up, the small 3D dinosaur cutter 512-2 rotates and protrudes from the front side of the bounded region 505.

Turning to FIG. 7B, in some embodiments, the method 700 further includes, as represented by block 740, displaying a second side of the bounded region, wherein the second side of the bounded region includes a rasterized conforming representation of the stereoscopic virtual object. In such embodiments, as represented by block 742, the method 700 further includes updating display of the second side of the bounded region in response to receiving the input. In some embodiments, updating the display of the second side of the bounded region further comprises: moving the rasterized conforming representation of the stereoscopic virtual object based on the first set of world coordinates; and modifying the rasterized conforming representation of the stereoscopic virtual object based on animating the stereoscopic virtual object.

For example, FIG. 5E illustrates the front side of the bounded region 505, while FIG. 5F illustrates the corresponding backside of the bounded region 505. In FIG. 5F, the backside of the bounded surface 505 includes the rasterized conforming representation 520-B of the 3D chicken 520 from the front side of the bounded region 505. In FIG. 5G, as the content of the bounded region 505 is scrolled up, the 3D dog 524 moves into the bounded region 505. While the 3D dog 524 is moved up further, content on the backside of the bounded region 505, as shown in FIG. 5H, is modified to show the rasterized conforming representation 524-B of the 3D dog 524.

In some embodiments, the method 700 further includes, as represented by block 750, designating a subregion within the bounded region, wherein the subregion includes the stereoscopic virtual object. In such embodiments, as represented by block 752, moving the content within the perimeter of the bounded region in accordance with the input includes: moving the stereoscopic virtual object out of a perimeter of the subregion; and converting the stereoscopic virtual object into a conforming virtual object for display outside the perimeter of the subregion in accordance with the first set of world coordinates in accordance with some embodiments. Also, in such embodiments, as represented by block 754, moving the content within the perimeter of the bounded region in accordance with the input includes: moving a conforming virtual object displayed outside a perimeter of the subregion inside the perimeter of the subregion; and converting the conforming virtual object into at least one stereoscopic virtual object.

For example, FIG. 5K illustrates the map 550 displayed within the bounded region 505, and the designated subregion 552 within the perimeter of the front side of the bounded region 505. In response to designating the subregion 552, as shown in FIG. 5L, stereoscopic virtual objects 560 are displayed within a perimeter of the subregion 552, e.g., the 3D view of the area close to Market St. Outside the perimeter of the subregion 552, a 2D map is displayed within the remainder of the bounded region 505. As the map 550 is panned or dragged, as shown in FIG. 5L, the map 550 is updated. For instance, in FIG. 5M, the 3D view of the area close to Market St. has been moved out of the subregion 522 and replaced by the 3D view of the area proximate to Jackson St. In other words, in response to the panning or dragging input, the 3D content (e.g., the 3D view of the area near Market St.) within the subregion 522 in FIG. 5L has been moved out of the perimeter of the subregion 522; and once moved out the subregion 522, such content is converted into 2D content on the map. Further in response to the panning or dragging input, some 2D content outside the subregion 522 in FIG. 5L (e.g., the 2D view of the area near Jackson St.) has been moved into the perimeter of the subregion 522; and once inside the subregion 522, such content is converted into 3D content.

In some embodiments, as represented by block 760, the content includes a conforming virtual object that conforms to a contour of the bounded region. The method 700 further includes displaying the conforming virtual object at a relative position to the stereoscopic virtual object based on the first set of world coordinates. For example, the content within the bounded region 505 also includes the 2D text "Dinosaur Cutters" 522 in FIG. 5A, the 2D text between the stereoscopic virtual objects (e.g., the 3D chicken 520 and the 2D text "Dinosaur Cutters" 522 in FIG. 5G), the 2D text "Ocean Liner" in FIG. 5I, the 2D text "Music" in FIG. 5J, and/or the 2D map outside the subregion 552 in FIGS. 5K-5M. In such embodiments, moving the content within the perimeter of the first side of the bounded region in accordance with the input includes moving the conforming virtual object in a direction of the input based on the first set of world coordinates while maintaining the relative position to the stereoscopic virtual object in accordance with some embodiments.

For example, in FIG. 5A, the 2D text "Dinosaur Cutters" 522 is displayed above the big 3D dinosaur cutter 512-1 and closer to the top edge of the bounded region 522. As the content is being scrolled upward, the 2D text "Dinosaur Cutters" 522 is moved upward along with the 3D stereoscopic virtual objects 512. As shown in FIG. 5B, the 2D text has been moved upward so much that it is clipped by the edge of the bounded region 505. In another example, in FIG. 5C, as the bounded region 505 lies flat, the 2D text "Dinosaur Cutters" 522 is behind the stereoscopic virtual objects 512 at a distance. In response to the scrolling from back to front, the 2D text "Dinosaur Cutters" 522 is moved in the same direction closer to the bottom edge of the bounded region 505 along with the stereoscopic virtual object 512, and the position of the 2D text "Dinosaur Cutters" 522 relative to the stereoscopic virtual object 512 is maintained, e.g., the 2D text "Dinosaur Cutters" 522 is still behind the big 3D dinosaur cutter 512-1 at the same relative distance.

Figure 8:
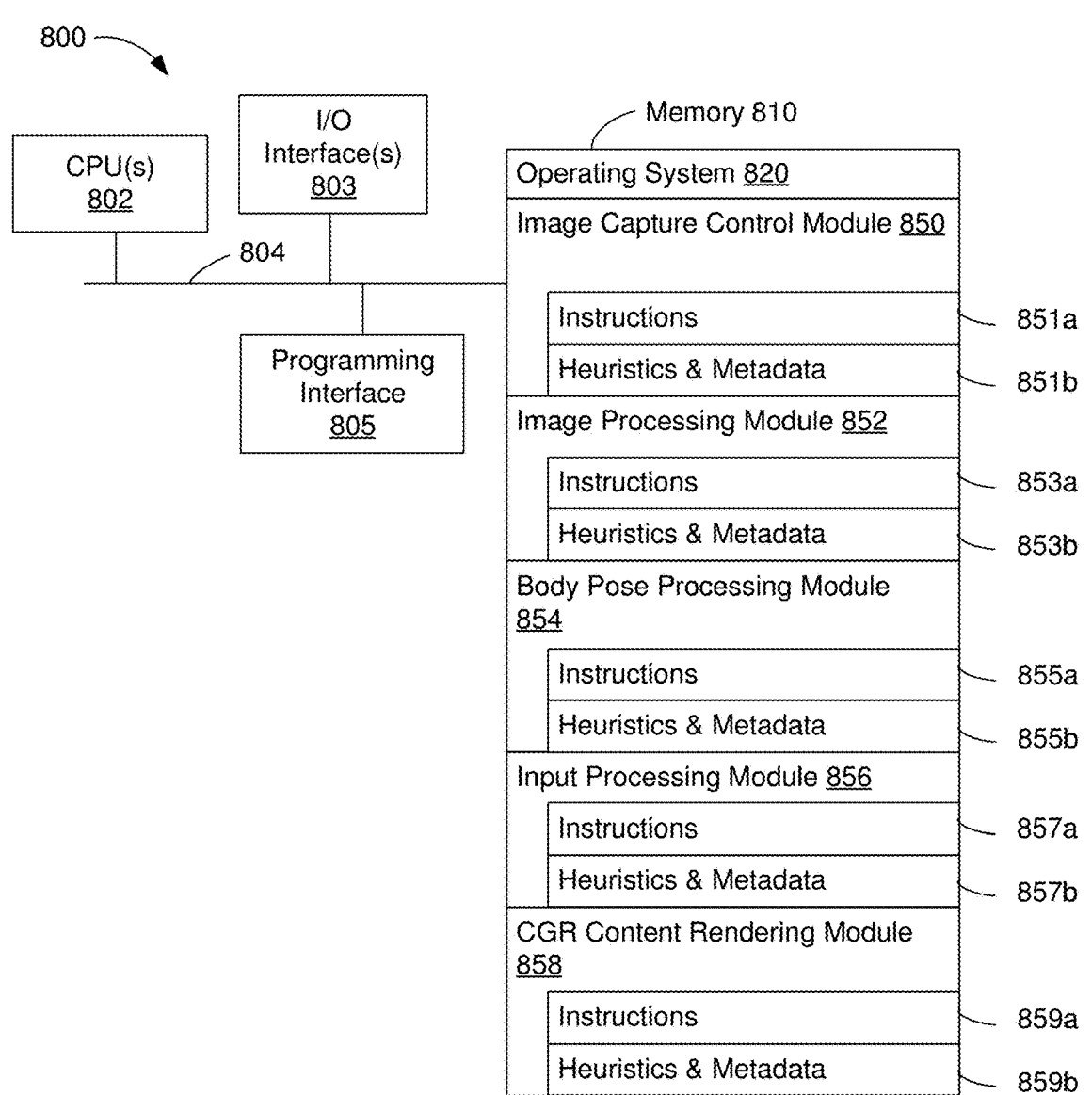
FIG. 8 is a block diagram of a computing device in accordance with some embodiments.

FIG. 8 is a block diagram of a computing device 800 in accordance with some embodiments. In some embodiments, the computing device 800 corresponds to at least a portion of the device 104 in FIG. 1A and performs one or more of the functionalities described above. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPUs) 802 (e.g., processors), one or more input/output (I/O) interfaces 803 (e.g., network interfaces, input devices, output devices, and/or sensor interfaces), a memory 810, a programming interface 805, and one or more communication buses 804 for interconnecting these and various other components.

In some embodiments, the one or more communication buses 804 include circuitry that interconnects and controls communications between system components. The memory 810 includes high-speed random-access memory, such as DRAM, SRAM, DDR RAM or other random-access solid-state memory devices; and, in some embodiments, include non-volatile memory, such as one or more magnetic disk storage devices, optical disk storage devices, flash memory devices, or other non-volatile solid-state storage devices. The memory 810 optionally includes one or more storage devices remotely located from the one or more CPUs 802. The memory 810 comprises a non-transitory computer readable storage medium. Moreover, in some embodiments, the memory 810 or the non-transitory computer readable storage medium of the memory 810 stores the following programs, modules and data structures, or a subset thereof including an optional operating system 820, an image capture control module 850, an image processing module 852, a body pose processing module 854, an input processing module 856, and a CGR content rendering module 858. In some embodiments, one or more instructions are included in a combination of logic and non-transitory memory. The operating system 820 includes procedures for handling various basic system services and for performing hardware dependent tasks.

In some embodiments, the image capture control module 850 is configured to control the functionality of an image sensor or camera assembly to capture images or obtain image data, e.g., obtaining image data for generating CGR content. To that end, the image capture control module 850 includes a set of instructions 851*a* and heuristics and metadata 851*b*.

In some embodiments, the image processing module 852 is configured to pre-process raw image data from the image sensor or camera assembly (e.g., convert RAW image data to RGB or YCbCr image data and derive pose information, etc.). To that end, the image processing module 852 includes a set of instructions 853*a* and heuristics and metadata 853*b*.

In some embodiments, the body pose processing module 854 is configured to process body pose of the user (e.g., processing IMU data), e.g., for generating user input based on body pose or body movements of the user. To that end, the body pose processing module 854 includes a set of instructions 855*a* and heuristics and metadata 855*b*.

In some embodiments, the input processing module 856 is configured to process user input, e.g., scrolling or dragging content on a virtual paper, moving the virtual paper, or walking to a different side of the virtual paper. To that end, the input processing module 856 includes a set of instructions 857*a* and heuristics and metadata 857*b*.

In some embodiments, the CGR content rendering module 858 is configured to composite, render, and/or display the CGR content items along with other post-processing image data. To that end, the CGR content rendering module 858 includes a set of instructions 859*a* and heuristics and metadata 859*b*.

Although the image capture control module 850, the image processing module 852, the body pose processing module 854, the input processing module 856, and the CGR content rendering module 858 are illustrated as residing on a single computing device, it should be understood that in other embodiments, any combination of the image capture control module 850, the image processing module 852, the body pose processing module 854, the input processing module 856, and the CGR content rendering module 858 can reside in separate computing devices in various embodiments. For example, in some embodiments each of the image capture control module 850, the image processing module 852, the body pose processing module 854, the input processing module 856, and the CGR content rendering module 858 can reside on a separate computing device or in the cloud.

Moreover, FIG. 8 is intended more as a functional description of the various features which are present in a particular embodiment as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors, a non-transitory memory, and one or more displays:
displaying a first side of a bounded region in a computer-generated reality (CGR) environment;
determining a distance between a perimeter of the bounded region and a stereoscopic virtual object displayed within a perimeter of the first side of the bounded region;
animating a portion of the stereoscopic virtual object as protruding from the first side of the bounded region and into the CGR environment when the distance of the stereoscopic virtual object from the perimeter of the first side of the bounded region is greater than a threshold; and
retracting the stereoscopic virtual object into the first side of the bounded region when the distance of the stereoscopic virtual object from the perimeter of the first side of the bounded region is not greater than the threshold.

2. The method of claim 1, wherein the stereoscopic virtual object is animated without user input.

3. The method of claim 1, wherein the stereoscopic virtual object is animated in response to a user input directed to the bounded region.

4. The method of claim 1, wherein retracting the stereoscopic virtual object into the first side of the bounded region when the distance of the stereoscopic virtual object from the perimeter of the first side of the bounded region is not greater than the threshold is performed in response to a user input interacting with content displayed within the first side of the bounded region.

5. The method of claim 1, further comprising:
occluding at least a part of the retracted stereoscopic virtual object by the perimeter of the first side of the bounded region.

6. The method of claim 1, further comprising:
illuminating the portion of the stereoscopic virtual object protruding from the first side of the bounded region by a first light source in the CGR environment.

7. The method of claim 6, wherein a second light source within the bounded region illuminates the stereoscopic virtual object retracted into the first side of the bounded region, and the second light source is different from the first light source.

8. The method of claim 1, further comprising:
displaying a conforming virtual object within the perimeter of the first side of the bounded region at a relative position to the stereoscopic virtual object, wherein the conforming virtual object conforms to a contour of the bounded region.

9. The method of claim 1, further comprising:
displaying a second side of the bounded region in the CGR environment, wherein the second side of the bounded region includes a rasterized conforming representation of the stereoscopic virtual object.

10. A device comprising:
one or more processors;
a non-transitory memory;
one or more displays; and
one or more programs stored in the non-transitory memory, which, when executed by the one or more processors, cause the device to:
display a first side of a bounded region in a computer-generated reality (CGR) environment; and
determine a distance between a perimeter of the bounded region and a stereoscopic virtual object displayed within a perimeter of the first side of the bounded region;
animate a portion of the stereoscopic virtual object as protruding from the first side of the bounded region and into the CGR environment when the distance of the stereoscopic virtual object from the perimeter of the first side of the bounded region is greater than a threshold; and
retract the stereoscopic virtual object into the first side of the bounded region when the distance of the stereoscopic virtual object from the perimeter of the first side of the bounded region is not greater than the threshold.

11. The device of claim 10, wherein the stereoscopic virtual object is animated without user input.

12. The device of claim 10, wherein the stereoscopic virtual object is animated in response to a user input directed to the bounded region.

13. The device of claim 10, wherein retracting the stereoscopic virtual object into the first side of the bounded region when the distance of the stereoscopic virtual object from the perimeter of the first side of the bounded region is not greater than the threshold is performed in response to a user input interacting with content displayed within the first side of the bounded region.

14. The device of claim 10, wherein the one or more programs further cause the device to: occlude at least a part of the retracted stereoscopic virtual object by the perimeter of the first side of the bounded region.

15. The device of claim 10, wherein the one or more programs further cause the device to: illuminate the portion of the stereoscopic virtual object protruding from the first side of the bounded region by a first light source in the CGR environment.

16. A non-transitory memory storing one or more programs, which, when executed by one or more processors of a device with one or more displays, cause the device to:
display a first side of a bounded region in a computer-generated reality (CGR) environment; and
determine a distance between a perimeter of the bounded region and a stereoscopic virtual object displayed within a perimeter of the first side of the bounded region;
animate a portion of the stereoscopic virtual object as protruding from the first side of the bounded region and into the CGR environment when the distance of the stereoscopic virtual object from the perimeter of the first side of the bounded region is greater than a threshold; and
retract the stereoscopic virtual object into the first side of the bounded region when the distance of the stereoscopic virtual object from the perimeter of the first side of the bounded region is not greater than the threshold.

17. The non-transitory memory of claim 16, wherein the stereoscopic virtual object is animated without user input.

18. The non-transitory memory of claim 16, wherein the stereoscopic virtual object is animated in response to a user input directed to the bounded region.

19. The non-transitory memory of claim 16, wherein retracting the stereoscopic virtual object into the first side of the bounded region when the distance of the stereoscopic virtual object from the perimeter of the first side of the bounded region is not greater than the threshold is performed in response to a user input interacting with content displayed within the first side of the bounded region.

20. The non-transitory memory of claim 16, wherein the one or more programs further cause the device to:
occlude at least a part of the retracted stereoscopic virtual object by the perimeter of the first side of the bounded region.

* * * * *